United States Patent
Stirling-Gallacher et al.

(10) Patent No.: US 10,057,787 B2
(45) Date of Patent: Aug. 21, 2018

(54) SYSTEM AND METHOD FOR MILLIMETER WAVE COMMUNICATIONS

(71) Applicant: Futurewei Technologies, Inc., Plano, TX (US)

(72) Inventors: Richard Stirling-Gallacher, San Diego, CA (US); Nathan Edward Tenny, Poway, CA (US); Bin Liu, San Diego, CA (US); Lili Zhang, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/092,388

(22) Filed: Apr. 6, 2016

(65) Prior Publication Data
US 2017/0295502 A1    Oct. 12, 2017

(51) Int. Cl.
| | |
|---|---|
| H04L 12/28 | (2006.01) |
| H04W 16/28 | (2009.01) |
| H04W 24/08 | (2009.01) |
| H04W 56/00 | (2009.01) |

(52) U.S. Cl.
CPC ........... *H04W 16/28* (2013.01); *H04W 24/08* (2013.01); *H04W 56/001* (2013.01)

(58) Field of Classification Search
CPC .... H04W 16/28; H04W 24/08; H04W 56/001
See application file for complete search history.

(56) References Cited

U.S. PATENT DOCUMENTS

| | | | |
|---|---|---|---|
| 9,814,068 B2* | 11/2017 | Frenne | ............... H04W 74/008 |
| 2013/0065622 A1 | 3/2013 | Hwang | |
| 2013/0195042 A1 | 8/2013 | Taori et al. | |

(Continued)

FOREIGN PATENT DOCUMENTS

| | | |
|---|---|---|
| CN | 103931109 A | 7/2014 |
| WO | 2016000092 A1 | 1/2016 |

OTHER PUBLICATIONS

Li, Q. C., et al., "Anchor-Booster Based Heterogeneous Networks with mmWave Capable Booster Cells," Globecom Workshops (GC Wkshps), Dec. 9-13, 2013, pp. 93-98.

(Continued)

*Primary Examiner* — Rebecca E Song
(74) *Attorney, Agent, or Firm* — Slater Matsil, LLP

(57) ABSTRACT

A method includes measuring beam-formed reference signals transmitted by a plurality of mmWave transmission points (TPs), sending a cloud cell formation request including indicators associated with best mmWave TPs determined in accordance with the measured beam-formed reference signals, receiving a cloud cell formation request response including indicators associated with a subset of the best mmWave TPs selected by a central controller in accordance with selection information, where the subset of the best mmWave TPs includes a first mmWave transmission point (TP) serving as a master TP and a second mmWave TP serving as a slave TP, and establishing a cloud cell with mmWave TPs of the subset of the best mmWave TPs selected by the central controller, where a data connection is established with the slave TP and at least a control connection is established with the master TP.

29 Claims, 30 Drawing Sheets

(56) References Cited

U.S. PATENT DOCUMENTS

| | | | |
|---|---|---|---|
| 2013/0322367 A1* | 12/2013 | Kang | H04W 48/16 370/329 |
| 2013/0322375 A1* | 12/2013 | Chang | H04W 72/0426 370/329 |
| 2014/0023040 A1 | 1/2014 | Son et al. | |
| 2014/0044065 A1* | 2/2014 | Agiwal | H04W 72/0433 370/329 |
| 2014/0148182 A1 | 5/2014 | Jeong et al. | |
| 2014/0269493 A1 | 9/2014 | Forenza et al. | |
| 2014/0334564 A1 | 11/2014 | Singh et al. | |
| 2015/0173100 A1* | 6/2015 | Aydin | H04W 72/0426 370/329 |
| 2015/0181502 A1 | 6/2015 | Hans et al. | |
| 2015/0181601 A1 | 6/2015 | Schmidt et al. | |
| 2015/0351135 A1 | 12/2015 | Schmidt et al. | |
| 2016/0057585 A1* | 2/2016 | Horn | H04W 80/02 370/312 |
| 2016/0057658 A1* | 2/2016 | Horn | H04L 43/16 370/236 |
| 2016/0057687 A1* | 2/2016 | Horn | H04W 24/10 370/331 |
| 2016/0066279 A1 | 3/2016 | Lee et al. | |
| 2017/0023040 A1* | 1/2017 | Stewart | A63B 63/004 |
| 2017/0033904 A1* | 2/2017 | Stirling-Gallacher | H04L 5/0048 |
| 2017/0086199 A1 | 3/2017 | Zhang et al. | |
| 2017/0126482 A1 | 5/2017 | Jayaraman et al. | |
| 2017/0150363 A1* | 5/2017 | Tenny | H04L 63/18 |
| 2017/0295502 A1* | 10/2017 | Stirling-Gallacher | H04W 16/28 |
| 2017/0295508 A1* | 10/2017 | Stirling-Gallacher | H04W 24/10 |
| 2017/0339662 A1* | 11/2017 | Lin | H04W 64/006 |

OTHER PUBLICATIONS

Taori, R., et al., "Cloud Cell: Paving the way for Edgeless Networks," Global Communications Conference (GLOBECOMM), Dec. 9-13, 2013, pp. 3546-3552.

Weiler, R. J., et al., "Split control plane functionality in millimeter-wave overlay access," 5G for Ubiquitous Connectivity (5GU), Nov. 26-28, 2014, pp. 134-139.

* cited by examiner

SYSTEM AND METHOD FOR MILLIMETER WAVE COMMUNICATIONS

TECHNICAL FIELD

The present disclosure relates generally to digital communications, and more particularly to a system and method for millimeter wave (mmWave) communications.

BACKGROUND

Some wireless communications systems, especially those operating in high frequencies (e.g., 6 GHz and above), often have communications links that are readily blocked by stationary or moving objects. Communications links with such characteristics are often referred to as being fragile or having link fragility.

SUMMARY OF THE DISCLOSURE

Example embodiments provide a system and method for millimeter wave (mmWave) communications In accordance with an example embodiment, a method for operating a millimeter wave (mmWave) user equipment (UE) is provided. The method includes measuring, by the mmWave UE, beam-formed reference signals transmitted by a plurality of mmWave transmission points (TPs), sending, by the mmWave UE, a cloud cell formation request including a measurement report comprising indicators associated with best mmWave TPs determined in accordance with the measured beam-formed reference signals, receiving, by the mmWave UE, a cloud cell formation request response including indicators associated with a subset of the best mmWave TPs selected by a central controller in accordance with selection information, where the subset of the best mmWave TPs includes a first mmWave transmission point (TP) serving as a master TP and a second mmWave TP serving as a slave TP, and establishing, by the mmWave UE, a cloud cell with mmWave TPs of the subset of the best mmWave TPs selected by the central controller, where a data connection is established with the slave TP and at least a control connection is established with the master TP.

In accordance with another example embodiment, a method for operating a central controller is provided. The method includes receiving, by the central controller, a cloud cell formation request including a measurement report comprising best beam-formed reference signals for best mmWave TPs determined in accordance with measured beam-formed reference signals transmitted by the mmWave TPs and indicators associated with the best mmWave TPs, selecting, by the central controller, a subset of the best mmWave TPs in accordance with the best beam-formed reference signals, where the subset of the best mmWave TPs includes a mmWave TP serving as a master TP and a mmWave TP serving as a slave TP, and sending, by the central controller, a cloud cell formation response including indicators associated with the subset of the best mmWave TPs.

In accordance with an example embodiment, a method for operating a first mmWave TP is provided. The method includes performing, by the first mmWave TP, an uplink synchronization with a mmWave UE, initiating, by the first mmWave TP, acknowledgements from second mmWave TPs to the mmWave UE to trigger beam-formed random access channel responses (RARs) to the mmWave UE, receiving, by the first mmWave TP, an indicator of a number of RARs received by the mmWave UE, and sending, by the first mmWave TP, an indicator of selected transmission parameters to the mmWave UE.

In accordance with an example embodiment, a mmWave UE adapted to perform digital communications is provided. The mmWave UE includes a processor, and a computer readable storage medium storing programming for execution by the processor. The programming including instructions to configure the mmWave UE to measure beam-formed reference signals transmitted by a plurality of mmWave TPs, send a cloud cell formation request including a measurement report comprising indicators associated with best mmWave TPs determined in accordance with the measured beam-formed reference signals, receive a cloud cell formation request response including indicators associated with a subset of the best mmWave TPs selected by a central controller in accordance with selection information, where the subset of the best mmWave TPs includes a first mmWave TP serving as a master TP and a second mmWave TP serving as a slave TP, and establish a cloud cell with mmWave TPs of the subset of the best mmWave TPs selected by the central controller, where a data connection is established with the slave TP and at least a control connection is established with the master TP.

In accordance with an example embodiment, a central controller adapted to perform digital communications is provided. The central controller includes a processor, and a computer readable storage medium storing programming for execution by the processor. The programming including instructions to configure the central controller to receive a cloud cell formation request including a measurement report comprising best beam-formed reference signals for best mmWave TPs determined in accordance with measured beam-formed reference signals transmitted by the mmWave TPs and indicators associated with the best mmWave TPs, select a subset of the best mmWave TPs in accordance with the best beam-formed reference signals, where the subset of the best mmWave TPs includes a mmWave transmission point (TP) serving as a master TP and a mmWave TP serving as a slave TP, and send a cloud cell formation response including indicators associated with the subset of the best mmWave TPs.

In accordance with an example embodiment, a first mmWave TP adapted to perform digital communications is provided. The first mmWave TP includes a processor, and a computer readable storage medium storing programming for execution by the processor. The programming including instructions to configure the first mmWave TP to perform an uplink synchronization with a mmWave UE, initiate acknowledgements from second mmWave TPs to the mmWave UE to trigger beam-formed RARs to the mmWave UE, receive an indicator of a number of RARs received by the mmWave UE, and send an indicator of selected transmission parameters to the mmWave UE.

In accordance with an example embodiment, a method for operating a first mmWave TP is provided. The method includes determining, by the first mmWave TP, that a change is needed to a configuration of a UE centric cloud cell, where the determining is in accordance with measurement reports of beam-formed reference signals transmitted by mmWave TPs of a measurement set, and when the change comprises a change to a modulation coding scheme (MCS) level of a communications link associated with the UE centric cloud cell, adjusting, by the first mmWave TP, the MCS level of the communications link. The method includes when the change comprises at least one of a change to a communications beam or a mmWave TP change, sending, by the first mmWave TP, a change query requesting the at least one of the change to the communications beam or the mmWave TP change, and receiving from a central controller, by the first mmWave TP, a confirmation message. The method includes updating, by the first mmWave TP, an mmWave UE and second mmWave TPs of the UE centric cloud cell regarding the change.

In accordance with an example embodiment, a method for operating a mmWave UE connected to a cloud cell is provided. The method includes sending, by the mmWave UE, measurement reports of beam-formed reference signals received from mmWave TPs of a measurement set, and receiving, by the mmWave UE, a cloud cell update including updated configuration information for the cloud cell.

In accordance with an example embodiment, a first mmWave TP adapted to perform digital communications is provided. The first mmWave TP includes a processor, and a computer readable storage medium storing programming for execution by the processor. The programming including instructions to configure the first mmWave TP to determine that a change is needed to a configuration of a UE centric cloud cell, where a determining that the change is needed is in accordance with measurement reports of beam-formed reference signals transmitted by mmWave TPs of a measurement set, and when the change comprises a change to a MCS level of a communication link associated with the UE centric cloud cell, adjust the MCS level of the communications link. The programming includes instructions to configure the first mmWave TP to, when the change comprises at least one of a change to a communications beam or a mmWave TP change, send a change query requesting the at least one of the change to the communications beam or the mmWave TP change, and receive a confirmation message. The programming includes instructions to configure the first mmWave TP to update a mmWave UE and second mmWave TPs of the UE centric cloud cell regarding the change.

In accordance with an example embodiment, an mmWave UE adapted to perform digital communications is provided. The mmWave UE includes a processor, and a computer readable storage medium storing programming for execution by the processor. The programming includes instructions to configure the mmWave UE to send measurement reports of beam-formed reference signals received from mmWave TPs of a measurement set, and receive a cloud cell update including updated configuration information for the cloud cell.

Practice of the foregoing embodiments enables the formation of mmWave UE centric cloud cells to improve mmWave operation in a dynamic environment.

Furthermore, the practice of the embodiments enable dynamic adaptation of mmWave UE centric cloud cells with low latency.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to systems and methods for millimeter wave (mmWave) communications. For example, a mmWave UE measures beam-formed reference signals transmitted by a plurality of mmWave transmission points (TPs), sends a cloud cell formation request including indicators associated with best mmWave TPs determined in accordance with the measured beam-formed reference signals, receives a cloud cell formation request response including indicators associated with a subset of the best mmWave TPs selected by a central controller in accordance with selection information, where the subset of the best mmWave TPs includes a first mmWave transmission point (TP) serving as a master TP and a second mmWave TP serving as a slave TP, and establishes a cloud cell with mmWave TPs of the subset of the best mmWave TPs selected by the central controller, where a data connection is established with the slave TP and at least a control connection is established with the master TP.

The embodiments will be described with respect to example embodiments in a specific context, namely communications systems that. The embodiments may be applied to standards compliant communications systems, such as those that are compliant with Third Generation Partnership Project (3GPP), IEEE 802.11, and the like, technical standards, and non-standards compliant communications systems, that.

Figure 1:
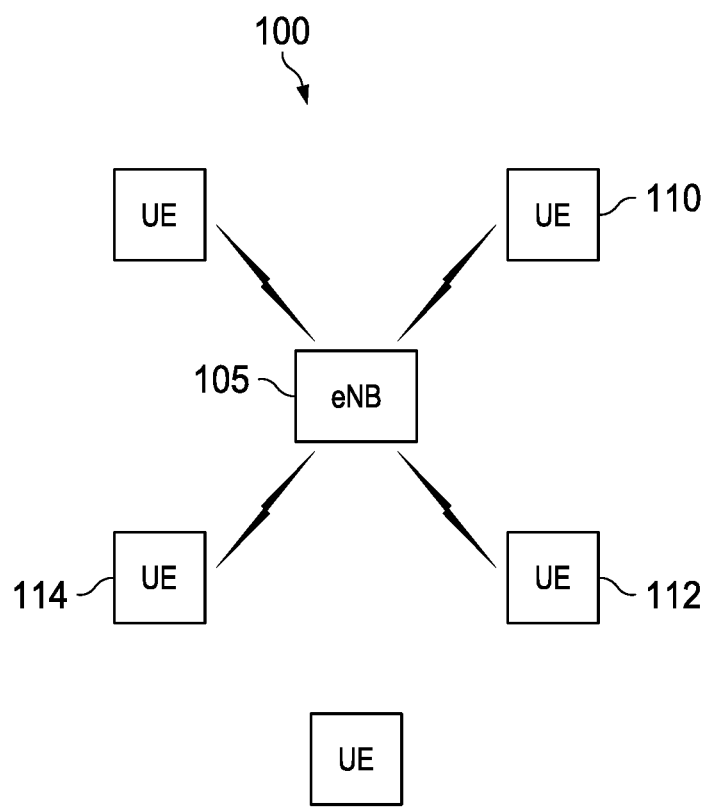
FIG. 1 illustrates an example wireless communications system according to example embodiments described herein.

FIG. 1 illustrates an example wireless communications system 100. Communications system 100 includes an evolved NodeB (eNB) 105 serving a plurality of user equipments (UEs), such as UE 110, UE 112, and UE 114. In a first operating mode, transmissions for UEs as well as transmissions by UEs pass through the eNB. The eNB allocates network resources for the transmissions to or from the UEs. eNBs may also be commonly referred to as base stations, NodeBs, remote radio heads, access points, and the like, while UEs may also be commonly referred to as mobiles, mobile stations, terminals, subscribers, users, stations, and the like. A base station (or an eNB, NodeB, remote radio head, access point, transmission point, and so on) that is serving one or more UEs may be referred to as a serving base station (SBS). A transmission point may be used to refer to any device capable of transmitting. Therefore, transmission points may refer to eNBs, base stations, NodeBs, remote radio heads, access points, UEs, mobiles, mobile stations, terminals, subscribers, users, and the like.

While it is understood that communications systems may employ multiple eNBs capable of communicating with a number of UEs, only one eNB, and a number of UEs are illustrated for simplicity.

A cell is a commonly used term that refers to a coverage area of an eNB. Typically, a cell is served by one or more sectors of a sectorized antenna of the eNB. Hence, the coverage area of the eNB includes a cell partitioned into a plurality of sectors. As an illustrative example, in a scenario where an eNB uses a three-sector antenna system, the cell of the eNB may be divided into three sectors, with each sector being covered by a separate antenna (with an example beam width of 120 degrees) or a separate part of the total antenna system. As another illustrative example, in a scenario where an eNB uses a six-sector antenna system (where each antenna may cover a 60 degree sector, for example), the cell of the eNB may be divided into six sectors or three sectors, with each sector being covered by one or two antennas or parts of the antenna system respectively.

Figure 2:
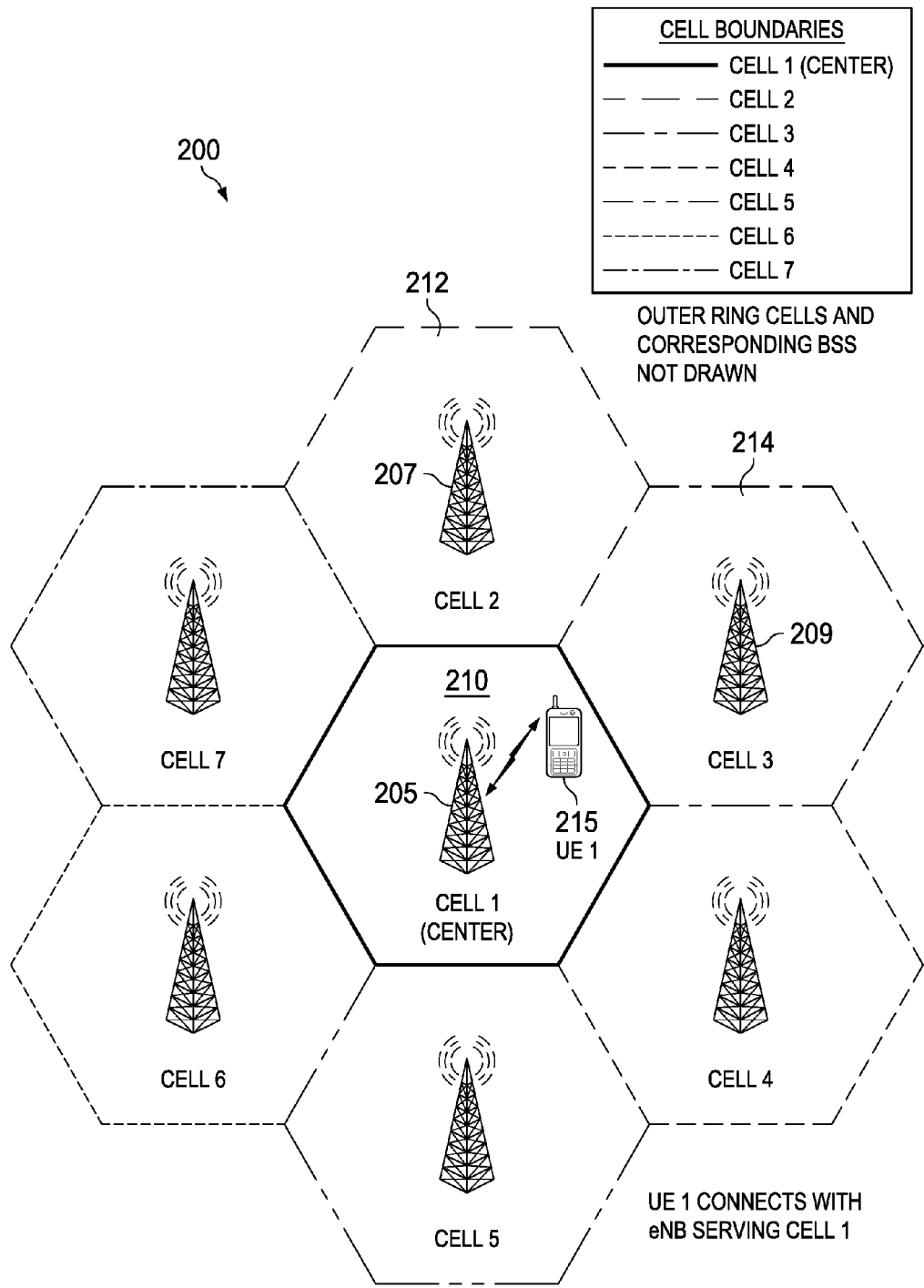
FIG. 2 illustrates an example legacy communications system according to example embodiments described herein.

FIG. 2 illustrates an example legacy communications system 200. Legacy communications system 200 includes a plurality of legacy eNBs, such as legacy eNB 205, legacy eNB 207, and legacy eNB 209. Each legacy eNB has a corresponding coverage area, e.g., legacy eNB 205 has coverage area 210, legacy eNB 207 has coverage area 212, and legacy eNB 209 has coverage area 214. The legacy eNBs serves UEs, such as legacy eNB 205 serving UE 215, that are operating in their corresponding coverage areas. Although the coverage areas are shown as hexagons, the coverage areas of each legacy eNB may be irregular in shape, depending upon respective propagation environments.

Figure 3:
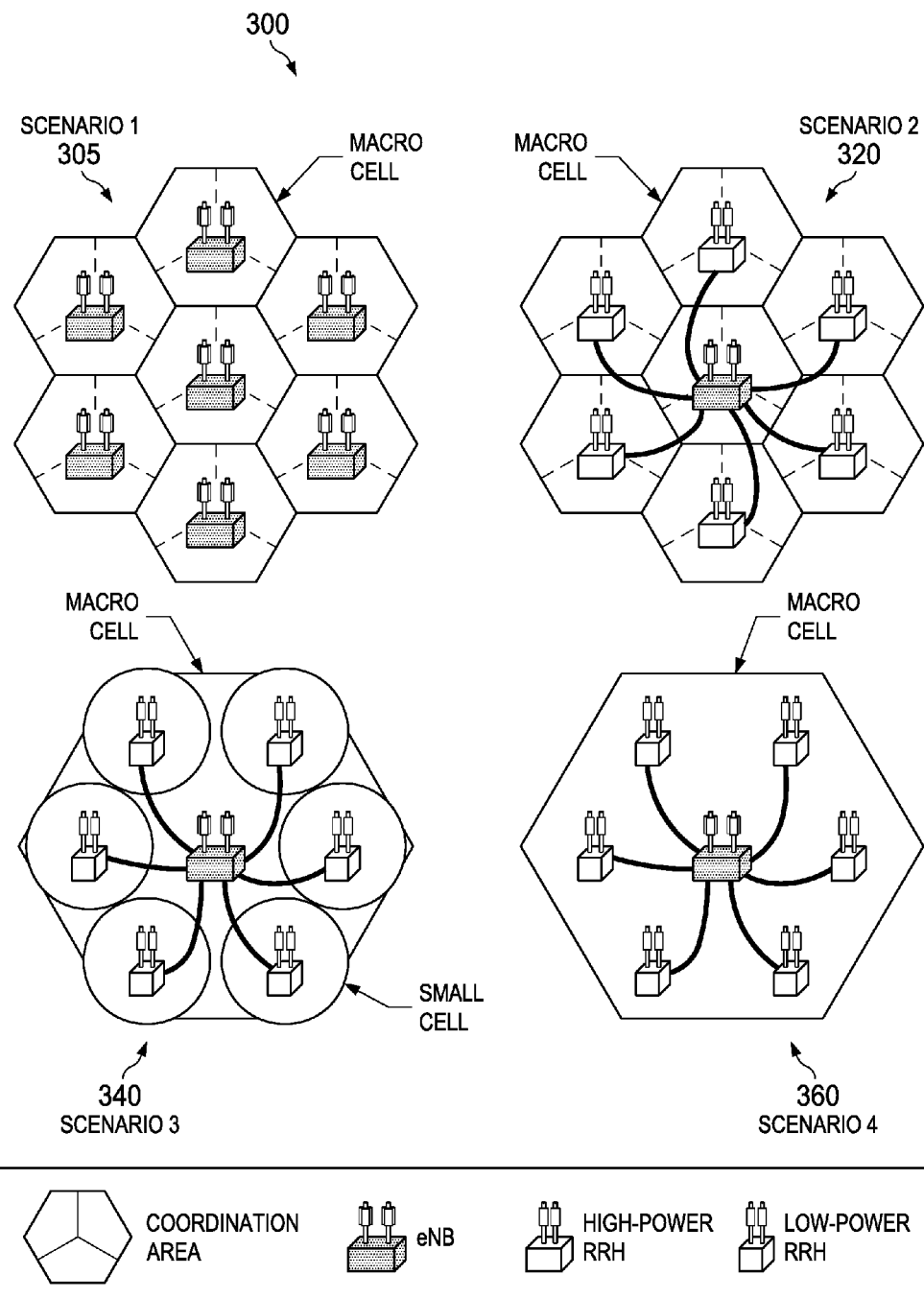
FIG. 3 illustrates four different deployment scenarios for coordinated multiple point (COMP) transmission for 3GPP LTE Release 11.

Coordinated multipoint (COMP) transmission was introduced in 3GPP Long Term Evolution (LTE) Release-11. In COMP transmission, multiple TPs coordinate and transmit data to a UE. FIG. 3 illustrate four different deployment scenarios 300 for COMP transmission in 3GPP LTE Release-11. Scenario 1 305 covers intra-site collaboration for homogeneous networks and scenario 2 320 covers inter-site collaboration for homogeneous networks. Scenarios 3 340 and 4 360 cover HetNets. Scenario 4 360 is a special case since remote radio heads (RRHs) have the same cell ID as the legacy TP (legacy eNB or high power TP) and form a set of distributed antennas for the high power TP. In order to enable common control signals, such as channel state information reference signal (CSI-RS), demodulation reference signal (DMRS), and so on, a virtual cell ID was introduced. In order to enable reporting from the UEs in a COMP measurement set to different TPs, multiple CSI-RS reporting processes and interference measurement resources (IMR) were introduced in 3GPP LTE Release-11.

Figure 4:
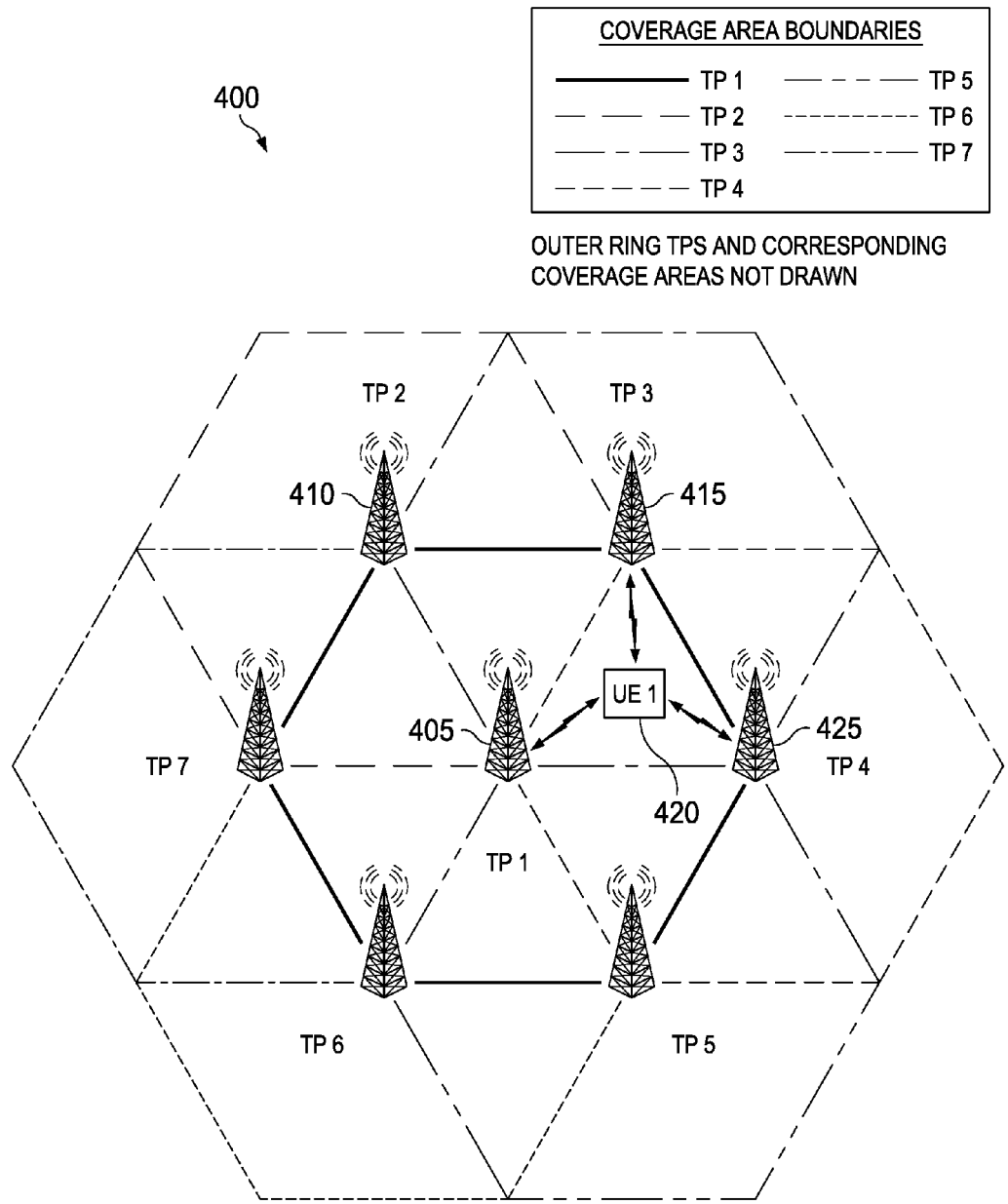
FIG. 4 illustrates an example communications system with a large degree of overlap in the coverage areas of TPs in communications system according to example embodiments described herein.

FIG. 4 illustrates an example communications system 400 with a large degree of overlap in the coverage areas of TPs in communications system 400. In general, an extension of COMP (in particular COMP scenario 4 360), communications system 400 includes TPs with coverage areas that overlap one another to a much greater extent than in previous communications systems. As shown in FIG. 4, TP1 405 is located at the outer edges of the coverage areas of its neighboring TPs, such as TP2 410, TP3 415, TP4 425, and so forth. Communications system 400 increases the potential number of UEs involved in collaborative operation (the number of UEs in the COMP measurement sets). As with traditional COMP, a low latency connection between the TPs is needed. Usually, with such a high degree of overlap, each UE, such as UE 420, can connect to multiple spatially separated TPs with much higher signal to noise ratios (SNRs), such as TP1 405, TP3 415, and TP4 425, than in more conventional systems. The higher SNR connections to spatially separated TPs may enable distributed multiple input multiple output (MIMO) techniques, such as distributed input distributed output (DIDO).

Communications systems with a large degree of overlap in the coverage areas of TPs, such as communications system 400, rely heavily on low latency high capacity links between the TPs. Although communications systems with a large degree of overlap may be less energy efficient than traditional legacy communications systems, energy efficiency may be realized when no load (or low load) TPs are placed in a sleep mode. The concept of communications systems with a large degree of overlap in the coverage areas of the TPs fits well into the ideas of UE cell centric or UE cloud cell since a set of connected TPs (referred to herein as UE cloud) can follow the UE as it moves through the coverage areas of the communications system. A TP may serve as a central controller that is dynamically assigned to the UE as it moves through the communications system.

In order to achieve increased capacity compared to legacy communications systems, the UE clouds (or sets of connected TPs) are formed from TPs with high SNR connections to a particular UE can perform coordinated scheduling and/or coordinated beam-forming (beam-forming from each TP), dynamic point selection and/or blanking or joint beam-forming from all TPs in a DIDO sense. As an illustrative example, TP 405, TP 415, and TP 425 form a UE cloud for UE 420.

A millimeter wave (mmWave) communications system is a communications system that operates in a frequency range where the wavelength of corresponding electromagnetic waves is on the order of a millimeter, which translate to frequencies of about 30 GHz and higher. Other communications systems operate in a frequency range where the wavelength of corresponding electromagnetic waves is on the order of a centimeter (such communications systems may be referred to as cmWave communications systems), which translate to frequencies of about 3 GHz and higher. As with mmWave communications systems, cmWave communications systems typically have fragile communications links that are easily blocked by stationary or moving objects.

Although the discussion focuses on mmWave communications systems and devices therein, the example embodiments presented herein are operable with wireless communications systems operating at any frequency where beam-forming is used. Therefore, the discussion of mmWave communications systems should not be construed as being limiting to either the scope or the spirit of the example embodiments.

A prior art technique that have been proposed to help overcome link fragility includes ultra-dense mmWave communications systems where the number of mmWave transmission points (TPs) is sufficiently high so that each UE has the possibility of connecting to multiple spatially separated TPs at the same time. Therefore, even with one or more communications links blocked, the UE may still have one or more unblocked communications links, thereby preserving connectivity.

According to an example embodiment, a communication system with a large degree of overlap in the coverage areas of TPs includes both a legacy communications system and an mmWave communications system. The mmWave communications system overlays the legacy communications system. A legacy UE is served by legacy eNBs that are part of the legacy communications system, while an mmWave UE is served by legacy eNBs of the legacy communications system and mmWave TPs of the mmWave communications system. In other words, the mmWave UEs are served by UE clouds. The inherent spatial diversity provided by the UE clouds (the legacy eNBs and the mmWave TPs) substantially increases the reliability of the TP to mmWave UE connections and protect against blocked paths (link fragility). The low latency high capacity links between the TPs, needed for such communications systems, may be implemented using in-band signaling, such as in the mmWave band, for example. In order to be operable in both the legacy communications system and the mmWave communications system, the mmWave UEs have legacy transceivers and mmWave transceivers.

The mmWave UEs have dual connectivity (control plane and data plane split), meaning that the mmWave UEs may receive control information and data from different TPs (e.g., legacy eNBs and/or mmWave TPs). As an example, an mmWave UE has data plane connectivity with mmWave TPs and control plane connectivity with legacy eNBs. Alternatively, an mmWave UE has data plane connectivity with mmWave TPs and data plane and control plane connectivity with legacy eNBs. Alternatively, an mmWave UE has data plane and control plane connectivity with mmWave TPs and data plane and control plane connectivity with legacy eNBs. Alternatively, an mmWave UE has data plane and control plane connectivity with mmWave TPs and data plane connectivity with legacy eNBs.

Figure 5:
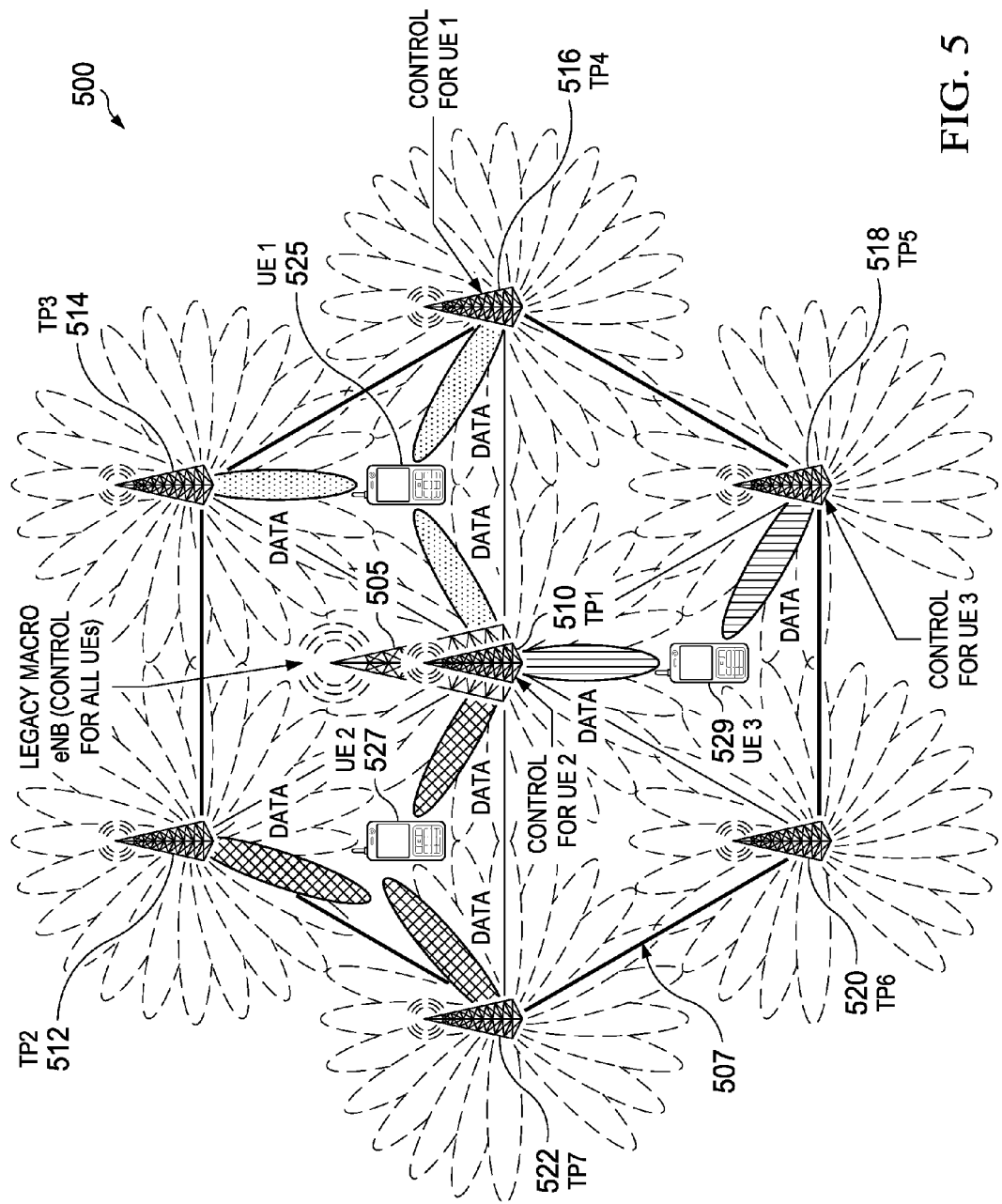
FIG. 5 illustrates a portion of an example communications system including a macro cell legacy communications system with an mmWave communications system overlay according to example embodiments described herein.

FIG. 5 illustrates a portion of an example communications system 500 including a macro cell legacy communications system with an mmWave communications system overlay. The macro cell legacy communications system includes a plurality of full power macro eNBs, however, only macro eNB 505 of the macro cell legacy communications system is shown. Macro cell eNB 505 has a coverage area 507. The mmWave communications system includes a plurality of mmWave TPs, such as TP 510 (which is located near macro eNB 505 or is co-located with macro eNB 505), TP 512, TP 514, TP 516, TP 518, TP 520, and TP 522.

Also shown in FIG. 5 are mmWave UEs, such as mmWave UE 525, mmWave UE 527, and mmWave UE 529. As an illustrative example, mmWave UE 525 receives data from mmWave TP 510, mmWave TP 514, and mmWave TP 516, and control information from mmWave TP 516. Similarly, mmWave UE 527 receives data from mmWave TP 510, mmWave TP 512, and mmWave TP 522, and control information from macro eNB 505 or mmWave TP 510; while mmWave UE 529 receives data from mmWave TP 510 and mmWave TP 518, and control information from mmWave TP 518.

mmWave UE centric cells may be defined in a virtual sense wherein each mmWave UE sees the set of surrounding TPs (forming an mmWave UE centric cell) as if the set of surrounding TPs was a single TP. The set of surrounding TPs in such a situation may be referred to as a mmWave UE centric virtual cell. According to such a definition, there may be a virtual cell identifier and corresponding virtual control and reference signals associated with the mmWave UE centric virtual cell. The use of such a definition enables the feedback of information to the set of surrounding TPs (the mmWave UE centric virtual cell) with one CSI-RS process. Alternatively, mmWave UE centric cells may also be defined in a non-virtual sense. In such a situation, an mmWave UE sees the TPs in a set of surrounding TPs as different TPs. The set of surrounding TPs in this situation may be referred to as an mmWave UE centric cloud cell.

According to an example embodiment, since mmWave communications require beam-forming to be performed from each TP, different cases of multiple point mmWave transmission are possible in the embodiment communications system, including:

Spatially separated but connected TPs sending the same data to a UE, which results in increased robustness via spatial diversity; and Spatially separated but connected TPs sending different data to a UE, which results in increased data rate via distributed MIMO.

According to an example embodiment, a mmWave UE has transceivers for both the legacy communications system (e.g., 3GPP LTE compliant) and a mmWave communications system that uses beam-forming. The control plane and the data planes are split across the two communications systems.

According to an example embodiment, two control planes, along with associated measurement and management procedures are provided. A first control plane connects an mmWave UE and an mmWave TP to provide fast but fragile connectivity, and a second control plane connects the mmWave UE and a legacy eNB to provide slow but robust connectivity. The associated procedures allow for the initial forming of the mmWave UE centric cloud cells, as well as the managing (i.e., scheduling, maintaining, and updating) of the mmWave UE centric cloud cells. The procedures related to the initial forming of the mmWave UE centric cloud cells specify how the UE performs CSI-RS measurements, and requests a set of mmWave TPs (by specifying beam directions, for example) to be formed into a mmWave UE centric cloud cell. The procedures also specify how a central controller processes the requests (check for interference and/or resource issues, for example) before the mmWave UE centric cloud cell is established. An uplink beam-formed synchronization technique (using a random access channel (RACH) process or otherwise) is also specified. The procedures related to the managing of the mmWave UE centric cloud cells specify ways in which measurements and feedback are handled to reduce latency.

The example embodiments will be described in light of the following considerations:

The numerology of the mmWave communications system is an integer multiple of the legacy communications system to ensure synchronized measurement reporting between the two communications systems. In other words, a fixed number of mmWave sub-frames times the mmWave sub-frame duration is equal to the legacy sub-frame duration;

The guard interval of the mmWave communications system is longer than a maximum timing difference from a possible serving mmWave TP in one link direction (either the uplink or the downlink). It is not assumed that the guard interval is longer than the round trip propagation delay since this would lead to too much guard interval overhead for the mmWave communications system. Therefore, each mmWave UE only needs to synchronize itself to a closest and/or strongest TP in each link direction;

The mmWave TPs are time synchronized; and

The mmWave TPs and the legacy eNBs are connected using high capacity low latency links, such as optical fiber, mmWave, or next generation front haul interfaces (NGFI) based on mmWave or otherwise.

Figure 6:
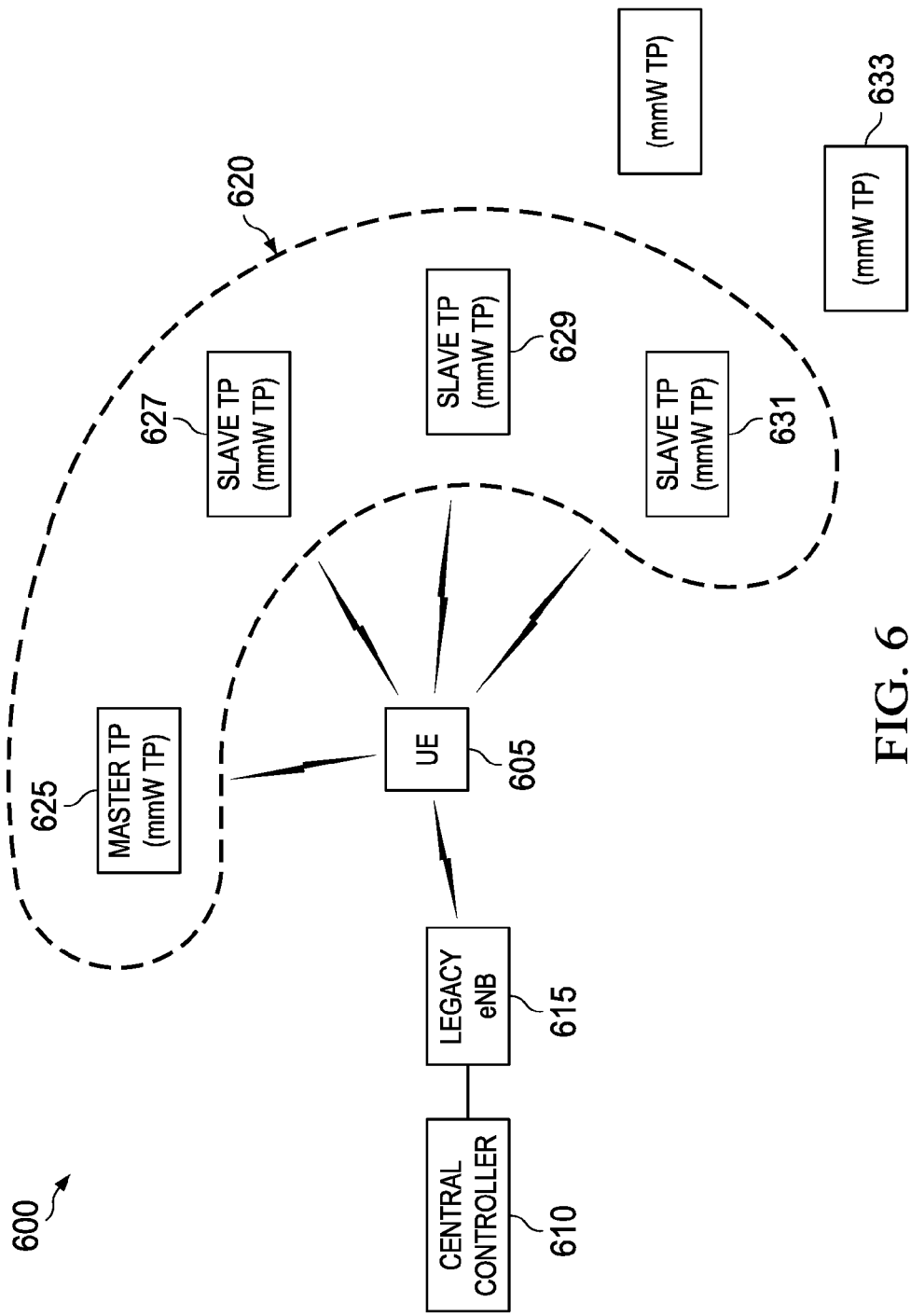
FIG. 6 illustrates an example communications system highlighting different types of devices according to example embodiments described herein.

FIG. 6 illustrates an example communications system 600 highlighting different types of devices. Communications system 600 may be an example of a communication system with a degree of overlap in the coverage areas of TPs. Communications system 600 includes both a legacy communications system and an mmWave communications system. Communications system 600 includes an mmWave UE 605. Communications system 600 also includes a central controller 610 and a legacy eNB 615. Central controller 610 has a robust control connection to mmWave UE 605 by way of legacy eNB 615. Central controller 610 may help to form and manage an mmWave UE centric cloud cell 620 for mmWave UE 605. Central controller 610 may decide which mmWave TP(s) will be used for each mmWave UE centric cloud cell (in accordance with requested mmWave TPs and communications beams signaled by mmWave UEs, condition of the mmWave TPs (such as load, reliability, interference condition of the mmWave TPs, and the like).

mmWave UE centric cloud cell 620 includes a master TP 625, and a set of slave TPs, such as slave TP 627, slave TP 629, and slave TP 631. Master TP 625 may decide local scheduling issues, such as modulation coding scheme (MCS) changes, and provides a fast control channel (faster than the robust control connection with legacy eNB 615). The fast control channel may be used for measurement feedback (from beam-formed CSI-RS, for example), preferred beam direction updates, or when the set of slave TPs needs to be changed. The set of slave TPs provide data connections to enable spatial diversity or increased data rate via distributed MIMO. The set of slave TPs may dynamically be assigned the role of master TP as channel conditions change or as mmWave UE 605 moves about communications system 600.

Communications system 600 also includes other mmWave TPs that are not part of mmWave UE centric cloud cell 620, including mmWave TP 633. Although the other mmWave TPs are not part of mmWave UE centric cloud cell 620 as shown in FIG. 6, some may become part of mmWave UE centric cloud cell 620 at a later time or may have been part of mmWave UE centric cloud cell 620 in the past.

Figure 7A:
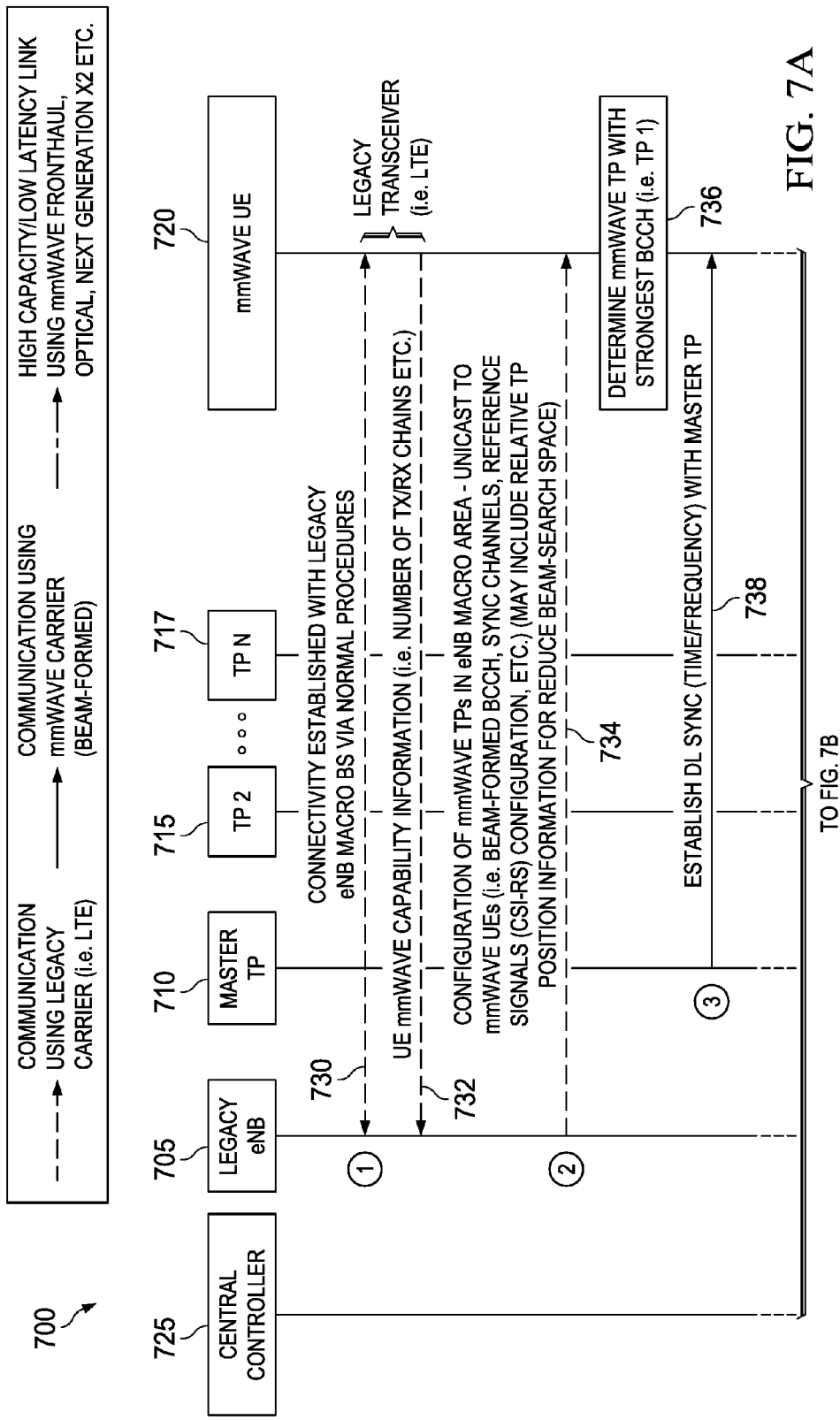
FIG. 7 illustrates a diagram highlighting messages exchanged and processing occurring in a forming of an mmWave UE centric cloud cell according to example embodiments described herein.
Figure 7B:
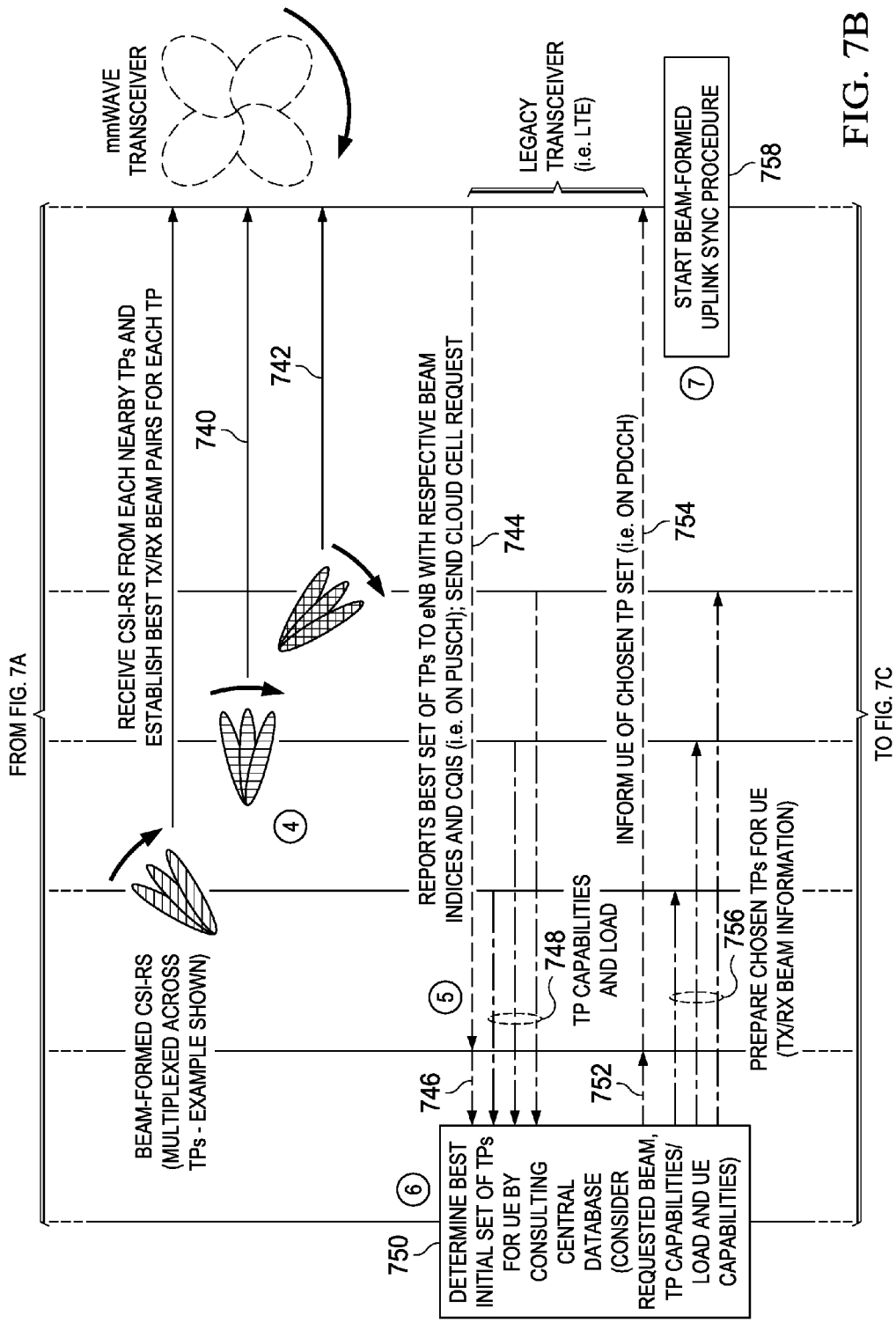
Figure 7C:
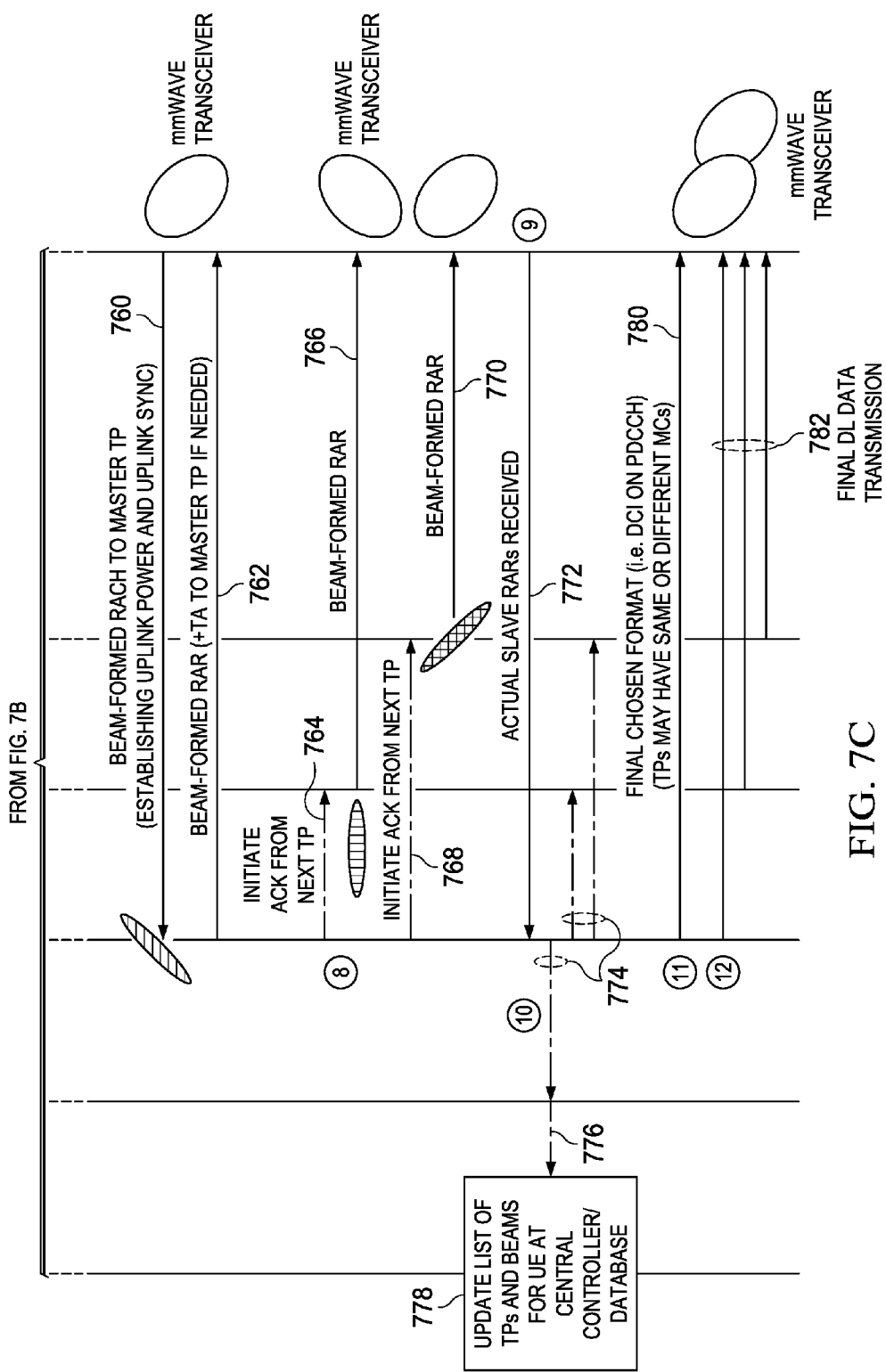

FIG. 7 illustrates a diagram 700 highlighting messages exchanged and processing occurring in a forming of an mmWave UE centric cloud cell. Diagram 700 illustrates messages exchanged and processing occurring in a legacy eNB 705, a master TP 710, one or more slave TPs (e.g., TP2 715 and TPN 717), an mmWave UE 720, and a central controller 725.

The forming of an mmWave UE centric cloud cell may begin when mmWave UE 720 connects with legacy eNB 705 (event 730). The connecting with legacy eNB 705 may occur using normal procedures, such as those specified in the 3GPP LTE technical standards. mmWave UE 720 sends a message to legacy eNB 705 informing legacy eNB 705 of the mmWave capabilities of mmWave UE 720 (event 732). The mmWave capabilities of mmWave UE 720 may include a number of transmit channels, a number of receive channels, and so on. Legacy eNB 705 sends a message signaling a configuration of mmWave TPs within a coverage area of legacy eNB 705 to mmWave UEs, including mmWave UE 720 (event 734). The configuration may be unicast to mmWave UE 720, as well as other mmWave UEs operating in the coverage area of legacy eNB 705. The configuration of the mmWave TPs may include beam-formed BCCH, synchronization channels, reference signal configuraton (such as CSI-RS), and so on. Each mmWave TP has unique interference-free beam-formed reference (e.g., synchronization reference signals, channel state information reference signals, and so on) and control signals. The configuration may also include relative mmWave TP position information to reduce the search space of the communications beams.

In accordance with the configuration, mmWave UE 720 measures transmissions made by the mmWave TPs and determines a strongest mmWave TP (block 736). As an illustrative example, mmWave UE 720 measures a broadcast control channel (BCCH) transmitted by each of the mmWave TPs. mmWave UE 720 synchronizes in the downlink with the strongest mmWave TP, selected in accordance with the measured transmissions (event 738). mmWave UE 720 synchronizes both in time and frequency with the strongest mmWave TP and the strongest mmWave TP becomes master TP 710. mmWave UE 720 receives beam-formed CSI-RS from each of the nearby mmWave TPs (events 740-742). mmWave UE 720 measures the beam-formed CSI-RS from the nearby mmWave TPs using its various receive communications beams and determines best transmit and receive communications beam pairs for each mmWave TP. mmWave UE 720 records an index corresponding to a best beam (or best set of beams) for each mmWave TP.

mmWave UE 720 sends a message with a report of a set of mmWave TPs to legacy eNB 705 (event 744). mmWave 720 also sends an mmWave UE centric cloud cell formation request (also event 744). Alternatively, the report of the set of mmWave TPs may serve as an mmWave UE centric cloud cell formation request, with a flag indicating that it is a request, for example. The report of the set of mmWave TPs may include beam indices of the best transmit and receive communications beam pairs for each mmWave TP of the set of mmWave TPs, as well as CQIs for each TP of the set of mmWave TPs. The report of the set of mmWave TPs may include indications of a preferred set of mmWave TPs (with their identifiers) and respective sets of beams and CQIs. It is noted that the preferred set of mmWave TPs may include more mmWave TPs than the number of communications beams that mmWave UE 720 is capable of receiving at any one time. Since mmWave UE 720 is knowledgeable of the periodicity of the beam-formed CSI-RS signals (via the CSI-RS configuration sent in event 734, for example), mmWave UE 720 may be able to determine that the preferred set of mmWave TPs is changing too rapidly or that the current mobility of mmWave UE 720 is too high (compared to CSI-RS periodicity), mmWave UE 720 may therefore elect to not send the report of the set of mmWave TPs to legacy eNB 705 since reliable mmWave communications may not be maintainable. Therefore, mmWave UE 720 may be able to determine if mmWave connectivity is feasible or not. Legacy eNB 705 forwards the report to central controller 725 (event 746). mmWave TPs 710-717 report TP capabilities and load information to central controller 725 (events 748). The reports by mmWave TPs 710-717 may be signaled over the high capacity low latency link.

Central controller 725 determines a set of mmWave TPs for mmWave UE 720, i.e., a set of mmWave TPs for the mmWave UE centric cloud cell (block 750). As an illustrative example, central controller 725 may determine the set of mmWave TPs by consulting a central database and considering selection information (i.e., requested communications beams, mmWave TP capabilities, mmWave TP load information, mmWave UE capabilities, interference condition, and so on). Central controller 725 signals information about the set of mmWave TPs to legacy eNB 705 (event 752). Legacy eNB 705 informs mmWave UE 720 about the set of mmWave TPs (event 754). Central controller 725 signals mmWave TPs in the set of mmWave TPs to prepare them for mmWave UE 720 (events 756) and in particular for subsequently receiving beam RACHs from the mmWave UE. Central controller 725 may signal information including transmit and receive communications beam index information to the mmWave TPs based on the best beam indices reported by each UE for each TP in event 744. The information enables the TPs to more effectively receive the beam-formed RACH from the UE. The signaling may occur over the high capacity low latency link.

mmWave UE 720 starts a beam-formed uplink synchronization procedure (block 758). The beam-formed uplink synchronization procedure may include mmWave UE 720 initiating a beam-formed RACH with master TP 710 (event 760). The beam-formed RACH may result in mmWave UE 720 determining uplink transmit power and establishing uplink synchronization with master TP 710. Master TP 710 sends a beam-formed RACH response (RAR) to mmWave UE 720 (event 762). Master TP 710 may also send timing advance information to mmWave UE 720 if needed. In an unlikely event that central controller 725 does not assign the strongest mmWave TP to the mmWave UE centric cloud cell, mmWave UE 720 may first synchronize with a master TP assigned by central controller 725 (which is different from the strongest mmWave TP found by mmWave UE 720), repeat the CSI-RS measurements again and repeat its mmWave UE centric cloud cell formation request with a revised CSI-RS measurement report, with contents that may be similar to the original request in message 744.

If the beam formed RACH from the UE (event 760) is successfully received by Master TP 710, Master TP 710 acknowledges the successful reception via a beam-formed RAR (event 762) and initiates an acknowledgement from the slave TPs of the set of mmWave TPs, in the order of their reported CQI values from the UE as received in message from event 744, for example. Master TP 710 initiates an acknowledgement from slave TP 715 (event 764). Slave TP 715 sends a beam-formed RAR to mmWave UE 720 (event 766). Master TP 710 initiates an acknowledgement from slave TP 717 (event 768). Slave TP 717 sends a beam-formed RAR to mmWave UE 720 (event 770). mmWave UE 720 informs master TP 710 about the RARs received from the slave TPs (event 772). Master TP 710 informs central controller 725 by way of legacy eNB 705 (events 774 and 776), as well as the slave TPs (events 774), about the RARs received by mmWave UE 720. Central controller 725 updates the central database based on information received about the RARs received by mmWave UE 720. Central controller 725 may update a list of TPs assigned to mmWave UE centric cloud cell operation, associated communications beams, and so on (event 778).

Master TP 710 signals mmWave UE 720 information regarding transmission format or parameters (event 780). The transmission format or parameters may include downlink control information (DCI) signaled on a physical downlink control channel (PDCCH). It is noted that different TPs (master TP 710 as well as slave TPs) may have the same or different MCS. The TPs (master TP 710 as well as slave TPs) transmit downlink data to mmWave UE 720 (events 782).

Figure 8:
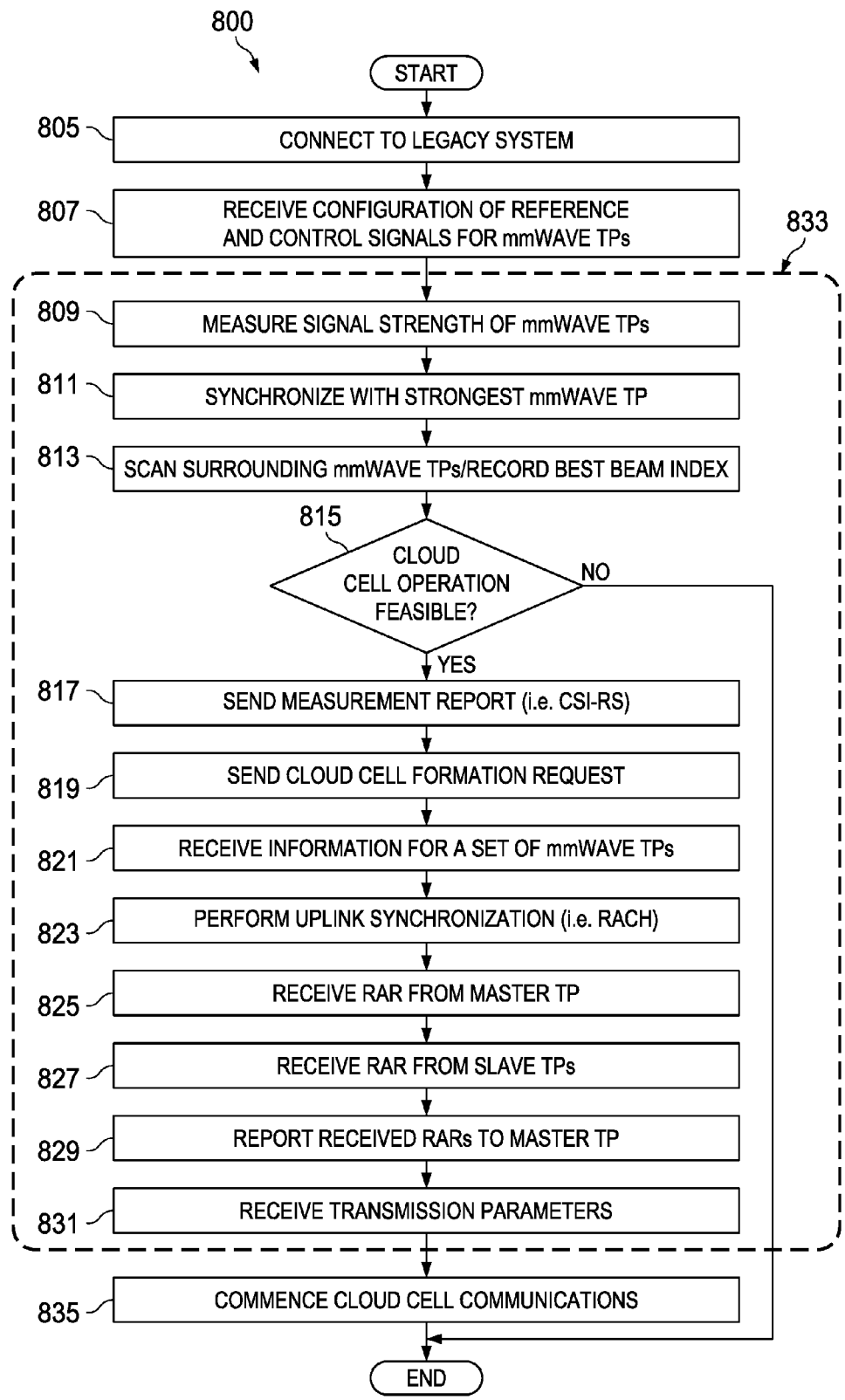
FIG. 8 illustrates a flow diagram of example operations occurring in an mmWave UE participating in a forming of an mmWave UE centric cloud cell according to example embodiments described herein.

FIG. 8 illustrates a flow diagram of example operations 800 occurring in an mmWave UE participating in a forming of an mmWave UE centric cloud cell. Operations 800 may be indicative of operations occurring in an mmWave UE that is participating in the forming of an mmWave UE centric cloud cell.

Operations 800 begin with the mmWave UE connecting to a legacy communications system (block 805). The mmWave UE may connect to the legacy communications system using one of a variety of techniques, such as those described in the 3GPP LTE technical standards. The mmWave UE receives information about the configuration of reference and control signal for mmWave TPs that are operating within a coverage area of a legacy eNB to which the mmWave UE is connected (block 807).

The mmWave UE measures the signal strength of the mmWave TPs that are operating within the coverage area of the legacy eNB (block 809). The mmWave UE selects the mmWave TP with the strongest signal strength and synchronizes with the mmWave TP (block 811). The mmWave UE scans the other mmWave TPs and records beam indices corresponding to the best transmit and receive communications beams for each of the other mmWave TPs (block 813).

The mmWave UE determines if cloud cell operation is feasible (block 815). As an illustrative example, if there is a sufficient number of mmWave TPs with adequately strong signal strengths, and the received signals from these mmWave TPs are not varying too quickly (indicating that the UE is moving too fast), then cloud cell operation is feasible. If cloud cell operation is not feasible, operations 800 may terminate. If cloud cell operation is feasible, the mmWave UE sends measurement reports for the mmWave TPs to the legacy eNB (block 817). The mmWave UE sends an mmWave UE centric cloud cell formation request to the legacy eNB (block 819). The mmWave UE receives information for a set of mmWave TPs (block 821). The set of mmWave TPs comprises mmWave TPs selected to form the mmWave UE centric cloud cell for the mmWave UE.

The mmWave UE performs uplink synchronization with the master TP (block 823). The uplink synchronization may be initiated with a RACH procedure, for example. The mmWave UE receives a RAR from the master TP of the mmWave UE centric cloud cell (block 825). The mmWave UE receives RARs from the slave TPs in the mmWave UE centric cloud cell (block 827). The mmWave UE reports the received RARs to the master TP (block 829). The mmWave UE receives information regarding a transmission format or parameters (block 831). The forming of the mmWave UE centric cloud cell is complete. Collectively, blocks 809 to 831 comprise the forming of the mmWave UE centric cloud cell (blocks 833). The mmWave UE commences cloud cell communications (block 835).

Figure 9:
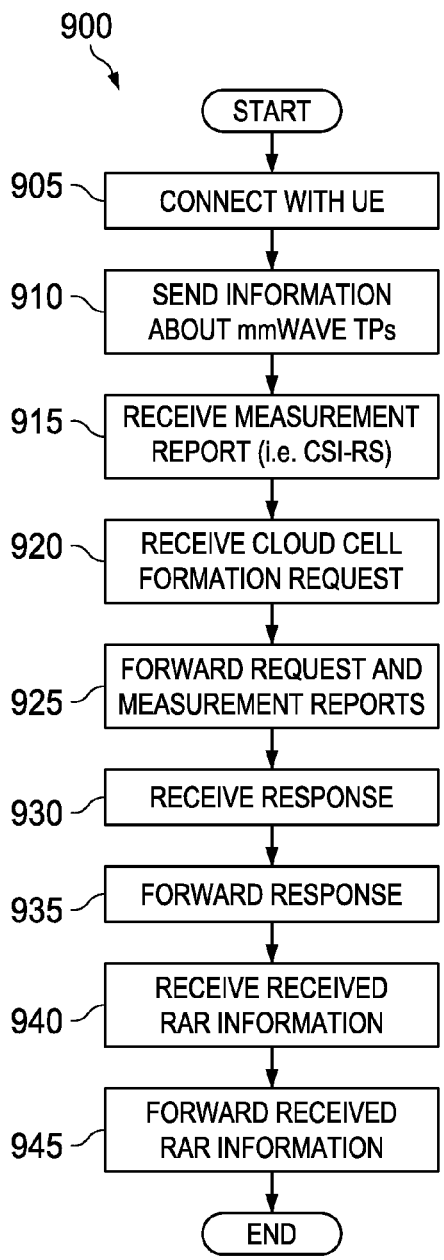
FIG. 9 illustrates a flow diagram of example operations occurring in a legacy eNB participating in a forming of an mmWave UE centric cloud cell according to example embodiments described herein.

FIG. 9 illustrates a flow diagram of example operations 900 occurring in a legacy eNB participating in a forming of an mmWave UE centric cloud cell. Operations 900 may be indicative of operations occurring in a legacy eNB as it participates in the forming of a mmWave UE centric cloud cell.

Operations 900 begin with the legacy eNB connecting with an mmWave UE (block 905) using the legacy transceiver contained in the mmWave UE. The legacy eNB sends information about mmWave TPs operating in the coverage area of the legacy eNB to the mmWave UE (block 910). The legacy eNB receives measurement reports from the mmWave UE (block 915). The measurement reports may be signal strength measurements (i.e., RSRP) or channel quality indication reports (CQI) made by the mmWave UE of beam-formed CSI-RS sent by the mmWave TPs. These reports may contain selected beam-index information for each of the selected mmWave TPs and corresponding mmWave TP identifiers. The legacy eNB receives an mmWave UE centric cloud cell formation request from the mmWave UE (block 920). The legacy eNB forwards the mmWave UE centric cloud cell formation request and the measurement reports made by the mmWave UE to a central controller (block 925). The legacy eNB receives a response from the central controller (block 930). The response from the central controller may include information about a set of mmWave TPs selected by the central controller based on the measurement reports made by the mmWave UE. The legacy eNB forwards the response to the mmWave UE (block 935). The legacy eNB receives information about received RARs from the mmWave UE (block 940). The legacy eNB forwards the information about the received RARs to the central controller (block 945).

Figure 10:
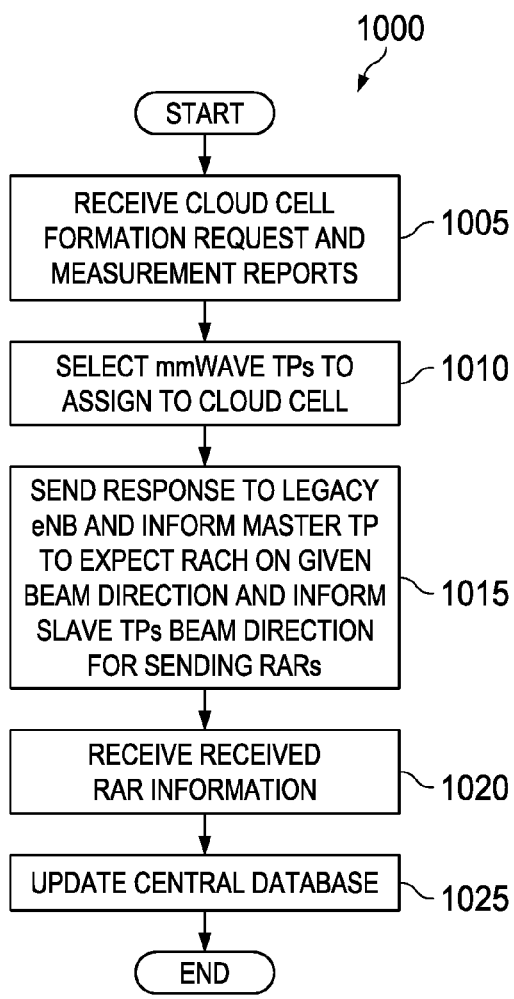
FIG. 10 illustrates a flow diagram of example operations occurring in a central controller participating in a forming of an mmWave UE centric cloud cell according to example embodiments described herein.

FIG. 10 illustrates a flow diagram of example operations 1000 occurring in a central controller participating in a forming of an mmWave UE centric cloud cell. Operations 1000 may be indicative of operations occurring in a central controller participating in the forming of an mmWave UE centric cloud cell.

Operations 1000 begin with the central controller receiving an mmWave UE centric cloud cell request and measurement reports (block 1005). The central controller selects mmWave TPs for the mmWave UE centric cloud cell (block 1010). The central controller may select the mmWave TPs in accordance with a central database and selection information (i.e., the requested communications beams, mmWave TP capabilities, mmWave TP load, mmWave UE capabilities, interference condition, and so on). The central controller sends a response to the mmWave UE centric cloud cell formation request to a legacy eNB (block 1015). The response may include information about the mmWave TPs selected by the central controller. The central controller also informs a master TP to expect a RACH on a specified communications beam direction and slave TPs communications beam directions for sending RARs (block 1015). The central controller receives a message with information regarding RARs received by the mmWave UE (block 1020). The central controller updates the central database in accordance with the information regarding the RARs received by the mmWave UE (block 1025).

Figure 11:
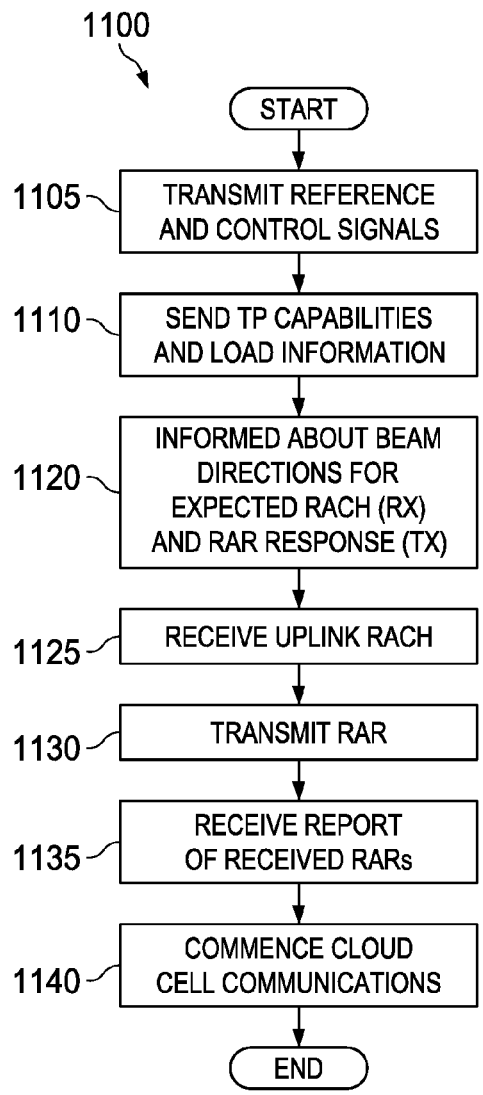
FIG. 11 illustrates a flow diagram of example operations occurring in a master TP participating in a forming of an mmWave UE centric cloud cell according to example embodiments described herein.

FIG. 11 illustrates a flow diagram of example operations 1100 occurring in a master TP participating in a forming of an mmWave UE centric cloud cell. Operations 1100 may be indicative of operations occurring in a master TP participating in the forming of an mmWave UE centric cloud cell.

Operations 1100 begin with the master TP transmitting reference and control signals (block 1105). The reference and control signals may be beam-formed, such as beam-formed CSI-RS. The master TP sends a message to a central controller informing the central controller the capabilities and load information of the master TP (block 1110). The master TP receives a message informing the master TP about communications beam directions for an expected RACH reception from an mmWave UE and for transmitting a RAR (block 1120). The master TP receives an uplink RACH and participates in uplink synchronization with the mmWave UE (block 1125). The master TP sends a RAR (block 1130). The master TP receives a report from the mmWave UE of the received RARs from the slave TPs (block 1135). The master TP commences mmWave UE centric cloud cell communications (block 1140).

Figure 12:
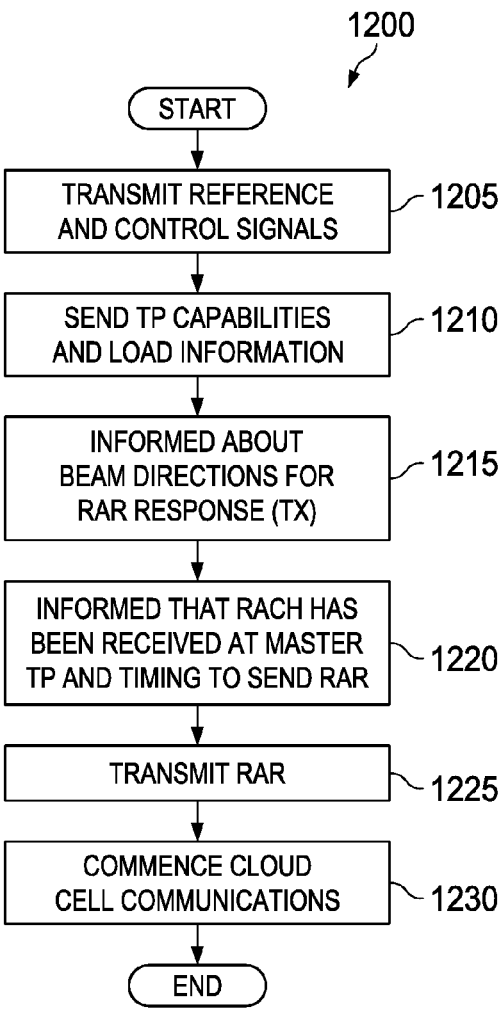
FIG. 12 illustrates a flow diagram of example operations occurring in a slave TP participating in a forming of an mmWave UE centric cloud cell according to example embodiments described herein.
Figure 13A:
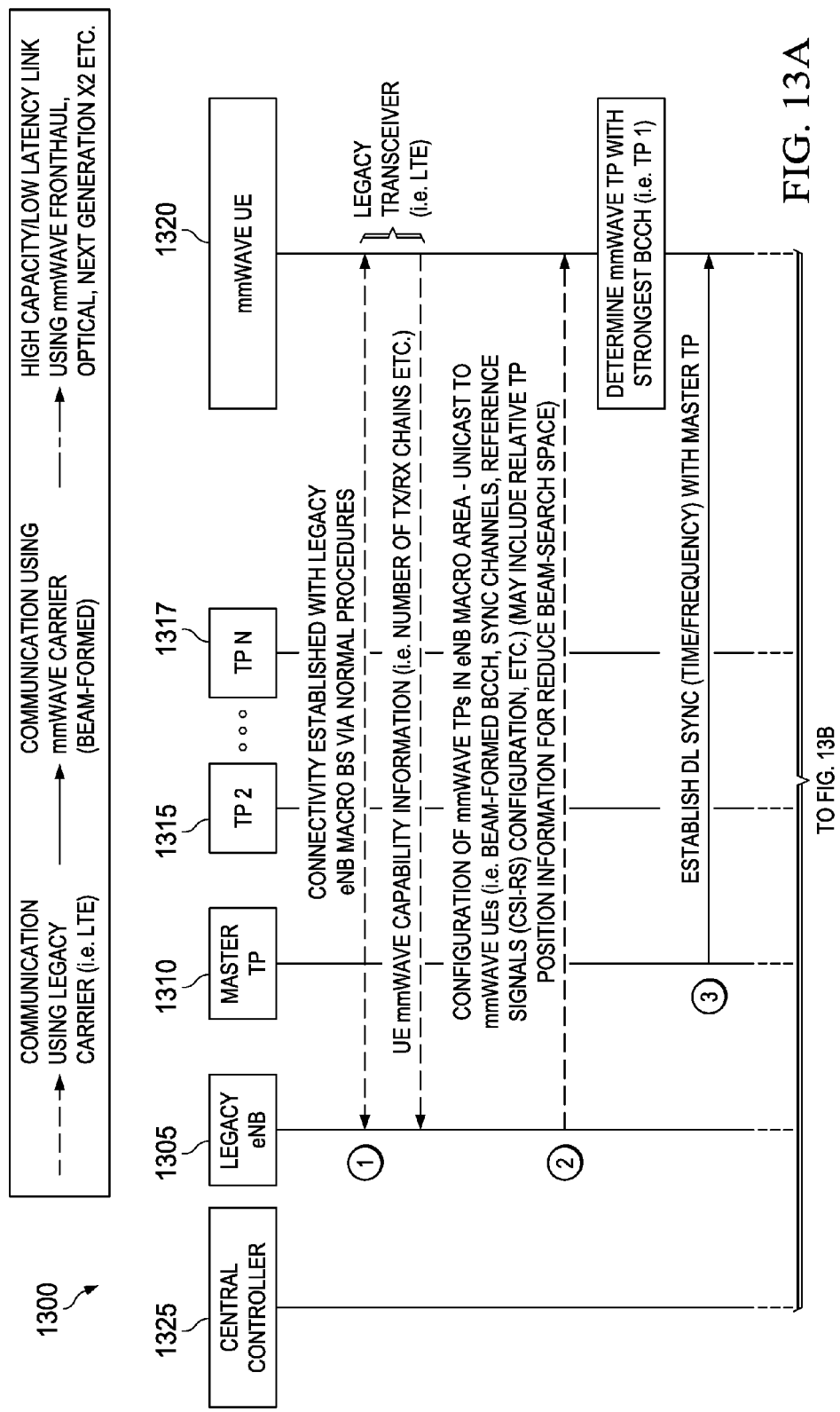
FIG. 13 illustrates a diagram highlighting messages exchanged and processing occurring in a forming of an mmWave UE centric cloud cell, highlighting an embodiment technique for handling a situation where an mmWave UE does not receive a RAR from a master TP according to example embodiments described herein.
Figure 13B:
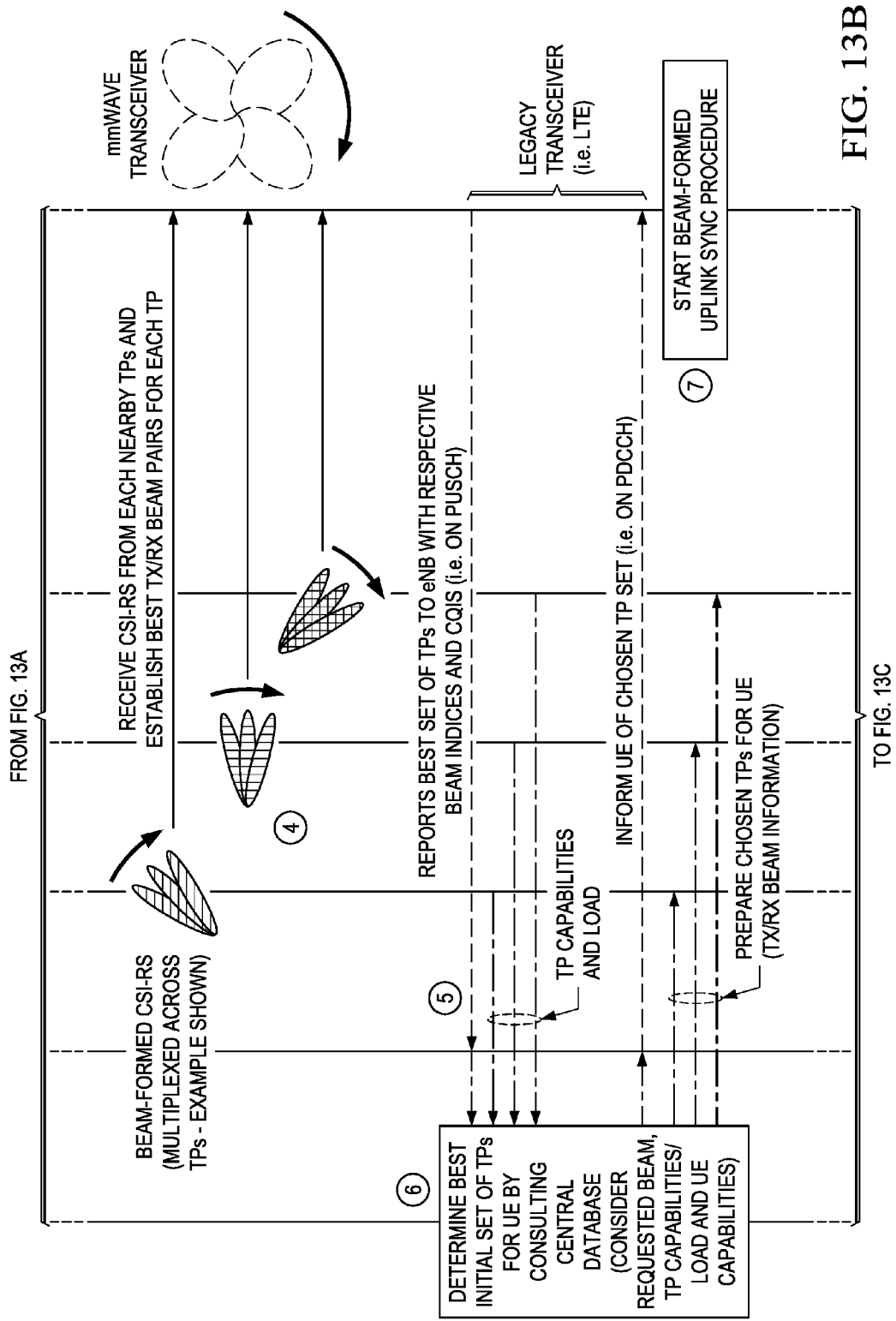
Figure 13C:
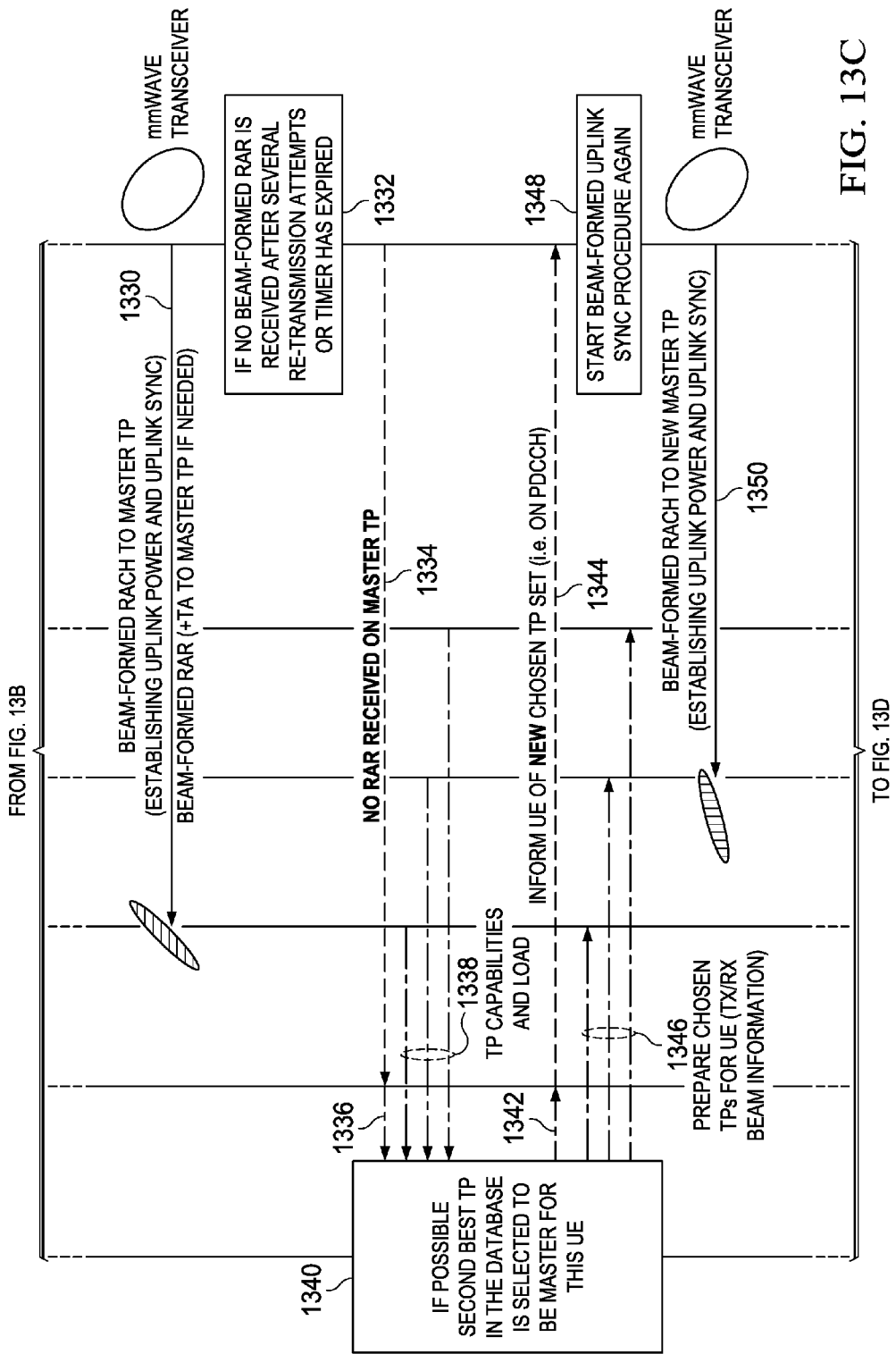
Figure 13D:
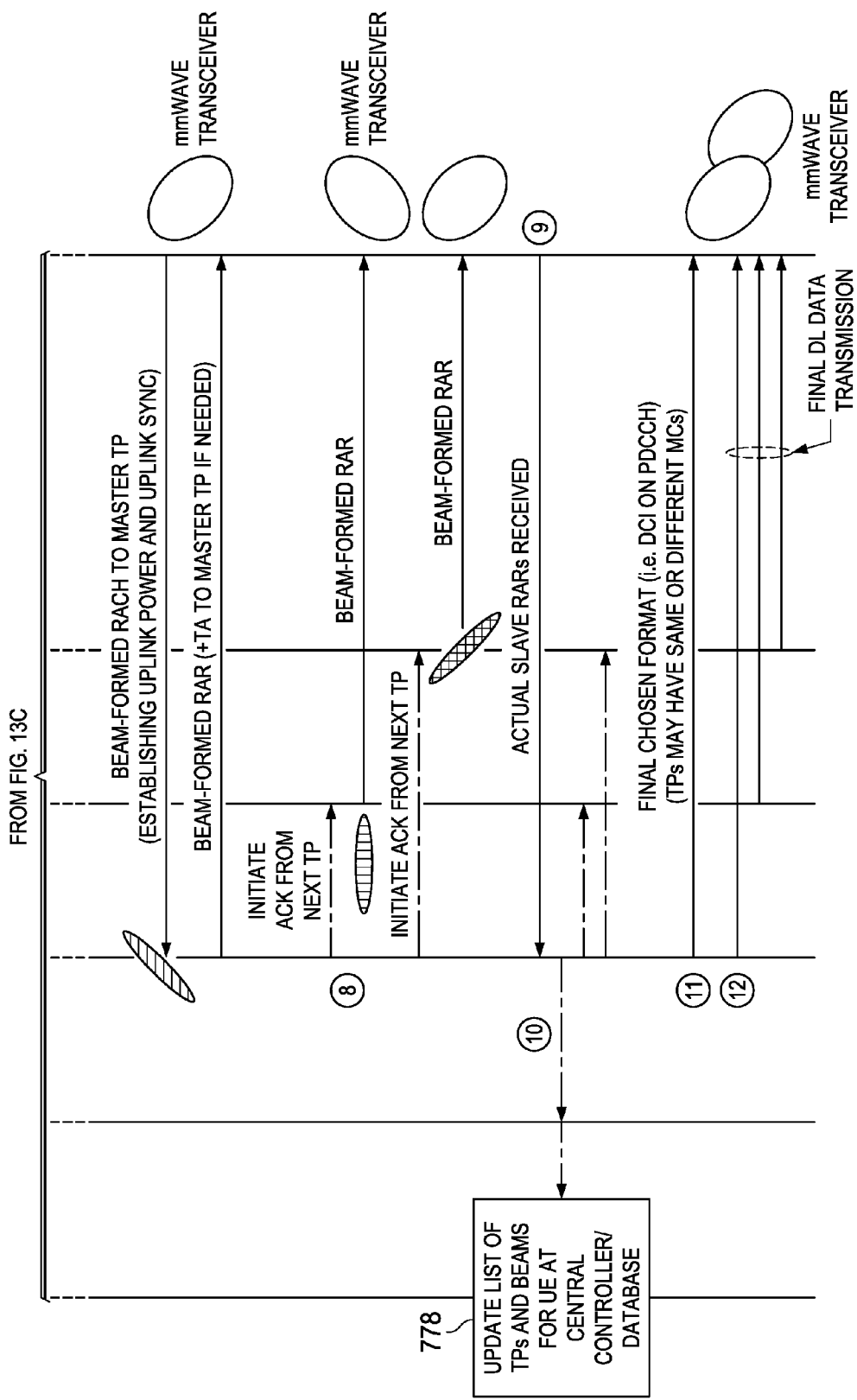

FIG. 12 illustrates a flow diagram of example operations 1200 occurring in a slave TP participating in a forming of an mmWave UE centric cloud cell. Operations 1200 may be indicative of operations occurring in a slave TP participating in the forming of an mmWave UE centric cloud cell.

Operations 1200 begin with the slave TP transmitting reference and control signals (block 1205). The reference and control signals may be beam-formed, such as beam-formed CSI-RS. The slave TP sends a message to a central controller informing the central controller the capabilities and load information of the slave TP (block 1210). The slave TP receives a message informing the slave TP about a direction of a communications beam for transmitting a RAR (block 1215). The slave TP receives a message informing the slave TP that a RACH has been received at a master TP and timing information for sending a RAR (block 1220). The slave TP sends the RAR (block 1225). The slave TP commences mmWave UE centric cloud cell communications (block 1230).

A situation may arise where the mmWave UE does not receive a RAR from the master TP of the mmWave UE centric cloud cell after the mmWave UE sends a RACH to determine an uplink transmit power level and perform uplink synchronization. If the mmWave UE does not receive a RAR from the master TP after a specified number of attempts or after a timeout timer expires, several example embodiments provide solutions for the mmWave UE.

According to an example embodiment, the mmWave UE repeats the measurement of the beam-formed CSI-RS and sends another mmWave UE centric cloud cell formation request to the legacy eNB. As an example, the mmWave UE repeats event 744 shown in FIG. 7.

According to an example embodiment, the mmWave UE informs the legacy eNB that it has not received a RAR from the master TP and initiates the selection of a different master TP. The selection of the different master TP may be based on the same beam-formed CSI-RS measurements made by the mmWave UE and the different master TP may be the next available mmWave TP selected by the mmWave UE as a member of the preferred set of mmWave TPs with the highest signal measurement.

FIG. 13 illustrates a diagram 1300 highlighting messages exchanged and processing occurring in a forming of an mmWave UE centric cloud cell, highlighting an embodiment technique for handling a situation where an mmWave UE does not receive a RAR from a master TP. Diagram 1300 illustrates messages exchanged and processing occurring in a legacy eNB 1305, a master TP 1310, one or more slave TPs (e.g., TP2 1315 and TPN 1317), an mmWave UE 1320, and a central controller 1325.

The messages exchanged and processing occurring in the forming of the mmWave UE centric cloud cell as shown in FIG. 13 proceeds in a manner similar to those shown in FIG. 7 until after mmWave UE 1320 sends a RACH to master TP 1310 (event 1330). If mmWave UE 1320 determines that it has not received a RAR from master TP 1310 after a specified number of attempts or if a timeout timer expires (block 1332), mmWave UE 1320 sends a message to legacy eNB 1305 indicating that it has not received a RAR from master TP 1310 (event 1334). Legacy eNB 1305 forwards the message to central controller 1325 (event 1336). Central controller 1325 receives mmWave TP capability and load information from the mmWave TPs operating in its coverage area (events 1338). Central controller 1325 selects a new set of mmWave TPs for mmWave UE 1320 and sends information about the new set of mmWave TPs to legacy eNB 1305 (event 1342) which forwards the information to mmWave UE 1320 (event 1344). As an illustrative example, central controller 1325 may determine the set of mmWave TPs by consulting a central database and considering requested communications beams, mmWave TP capabilities, mmWave TP load, mmWave UE capabilities, interference, and so on.

Central controller 1325 signals mmWave TPs in the set of mmWave TPs to prepare them for mmWave UE 1320 (events 1346). Central controller 1325 may signal information including transmit and receive communications beam information. The signaling may occur over the high capacity low latency link. mmWave UE 1320 repeats the beam-form uplink synchronization procedure (block 1348), by sending a beam-formed RACH to the new master TP, which is shown in FIG. 13 as mmWave TP 1315 (event 1350).

It may be necessary to manage an mmWave UE centric cloud cell after it has been formed. Management of the mmWave UE centric cloud cell includes: changing transmission format or parameters, changing master TP, adding slave TPs, removing slave TPs, dissolving the mmWave UE centric cloud cell, changing central controller for the mmWave UE centric cloud cell, and so on.

According to an example embodiment, techniques for managing mmWave UE centric cloud cells are provided. According to an example embodiment, feedback and signaling mechanisms are provided.

In order to discuss the management of mmWave UE centric cloud cells, a variety of different sets of mmWave TPs for mmWave UEs are defined as follows:

Set A: Set of mmWave TPs that are within the mmWave UE's synchronization window. Set A mmWave TPs are mmWave TPs that the mmWave UE can detect (i.e., the channels between these mmWave TPs and the mmWave UE have sufficient SNR) in the current guard interval of the mmWave UE, so that the beam-formed CSI-RS of the relevant mmWave TPs can be received;

Set B: Set of CSI-RS reporting mmWave TPs (e.g., CQI, beam index (BI), rank indicator (RI) from the CSI-RS measurements). Set B mmWave TPs are the mmWave TPs that the mmWave UE measures and reports in the CSI-RS measurement reports. Set B is a subset of Set A. The members of Set B will be mmWave TPs that meet certain parameters of the CSI-RS configuration (e.g., maximum number of reported mmWave TPs, minimum SNR or CQI of a TP, and so on). The CSI-RS configuration may be independently set for reports sent to the legacy eNB and the master TP. The mmWave UE may decide which members of Set A are also in Set B subject to the constraints of the CSI-RS configuration. and Set C: Set C is a subset of Set B. Set C represents a current set of mmWave TPs which are involved in control and/or data communications with the mmWave UE. The master TP and the central controller may determine which members of Set B are in Set C.

Figure 14:
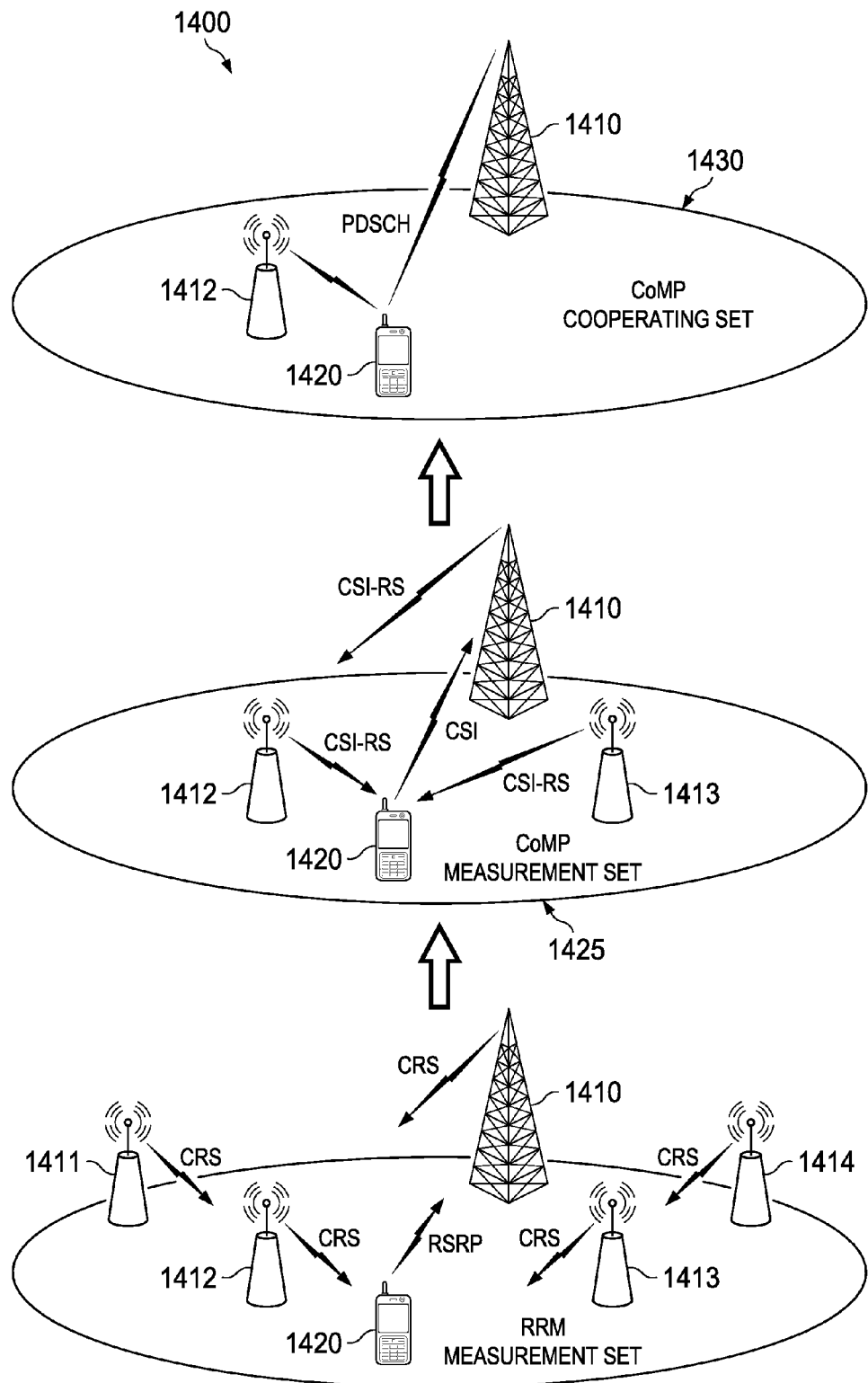
FIG. 14 illustrates a diagram of example measurement sets in a 3GPP LTE compliant communications system according to example embodiments described herein.

In a 3GPP LTE compliant communications system, a legacy UE is configured through radio resource control (RRC) messages to report radio resource measurements (RRM) of TPs in the RRM set. The RRMs are used by network-side entities (e.g., eNBs, controllers, and so on) to determine which TPs will be in a COMP measurement set. FIG. 14 illustrates a diagram 1400 of example measurement sets in a 3GPP LTE compliant communications system. A RRM measurement set 1405 includes TPs, such as TPs 1410-1414, deployed within the general vicinity of a legacy UE 1420. Legacy UE 1420 measures transmissions made by the TPs, e.g., cell specific reference signals (CRS), and reports RRMs to a network-side entity, such as TP 1410 (a legacy eNB). A COMP measurement set 1425 comprises TPs, such as TP 1410, TP 1412, and TP 1413, that are members of RRM measurement set 1405 that have been selected by a network-side entity (in accordance with their respective RRM reports, for example) as candidates for COMP operation with legacy UE 1420. The TPs in COMP measurement set 1425 transmit CSI-RS to enable legacy UE 1420 to make measurements. COMP measurement set 1425 may be similar to Set B defined above (except with the proposed approach the mmWave UE decides which TPs are part of this set as opposed to the network-side entities in 3GPP LTE compliant communications systems). A COMP cooperation set 1430 comprises TPs, such as TP 1410 and TP 1412, that have been selected by a network-side entity (in accordance with their respective CSI-RS measurements) to participate in COMP operations with legacy UE 1420. COMP cooperation set 1430 may be similar to Set C defined above.

According to an example embodiment, each mmWave UE will determine by itself which mmWave TPs will be in Set B (Set of CSI-RS reporting mmWave TPs) which is in contrast to 3GPP LTE. Self-determination of Set B by the mmWave UEs enables operation with reduced latency.

According to an example embodiment, mmWave UEs monitor synchronization signals of surrounding mmWave TPs and the CSI-RSs of the mmWave TPs that are within its synchronization window or guard time, i.e., Set A members. The regular monitoring of the synchronization signals and the beam-formed CSI-RSs enable the mmWave TPs to provide feedback and signaling with low latency, thereby support the rapidly changing environment inherent in mmWave communications systems. Furthermore, the large uplink bandwidth typically available in mmWave communications systems is exploited to enhance performance. As an illustrative example, the mmWave UEs provide complete CSI-RS measurement reports for a plurality of mmWave TPs (using the large uplink bandwidth) to facilitate fast switching of communications beams and mmWave TPs.

Figure 15A:
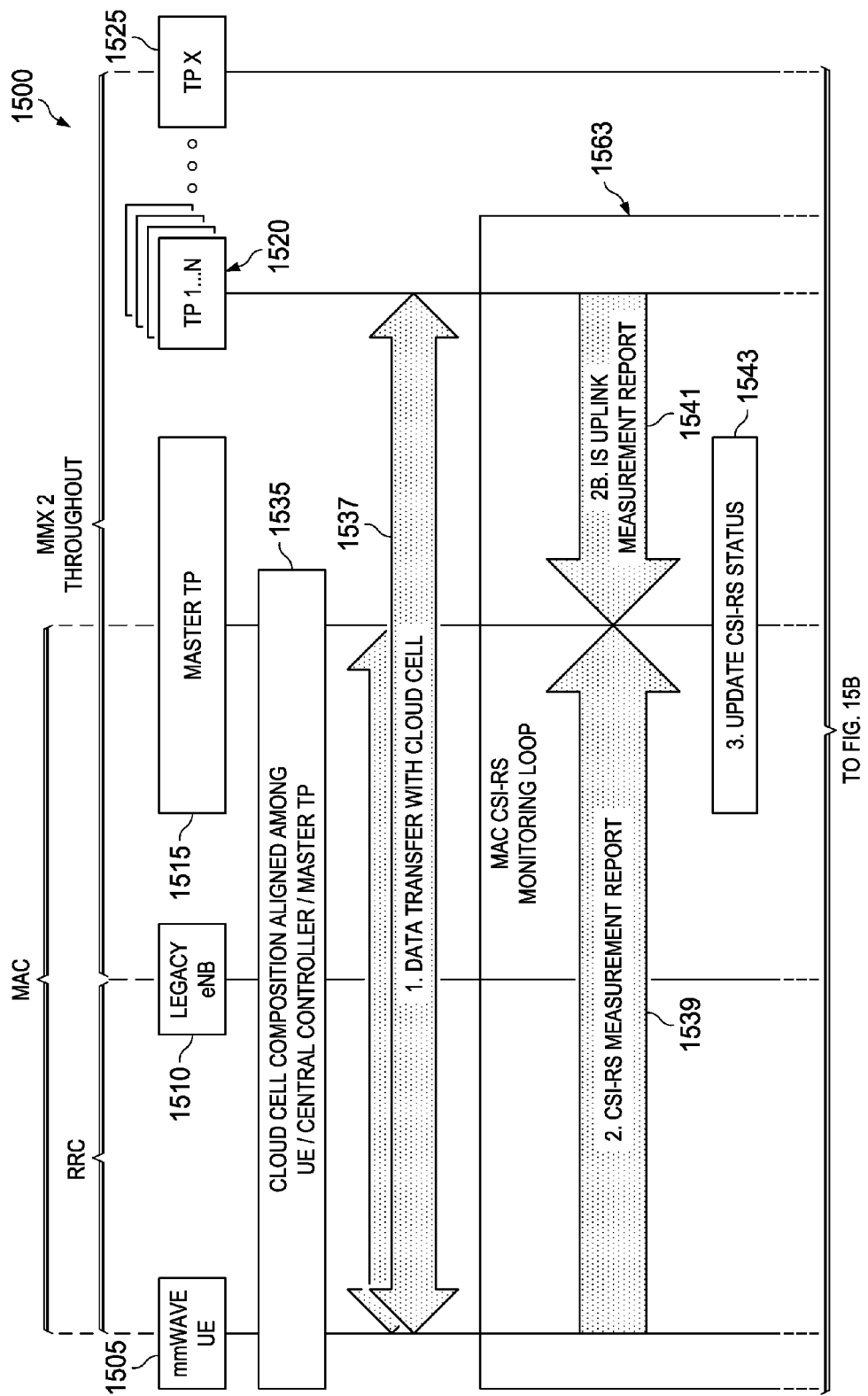
FIG. 15 illustrates a diagram highlighting messages exchanged and processing occurring in managing an mmWave UE centric cloud cell, highlighting feedback and signaling according to example embodiments described herein.
Figure 15B:
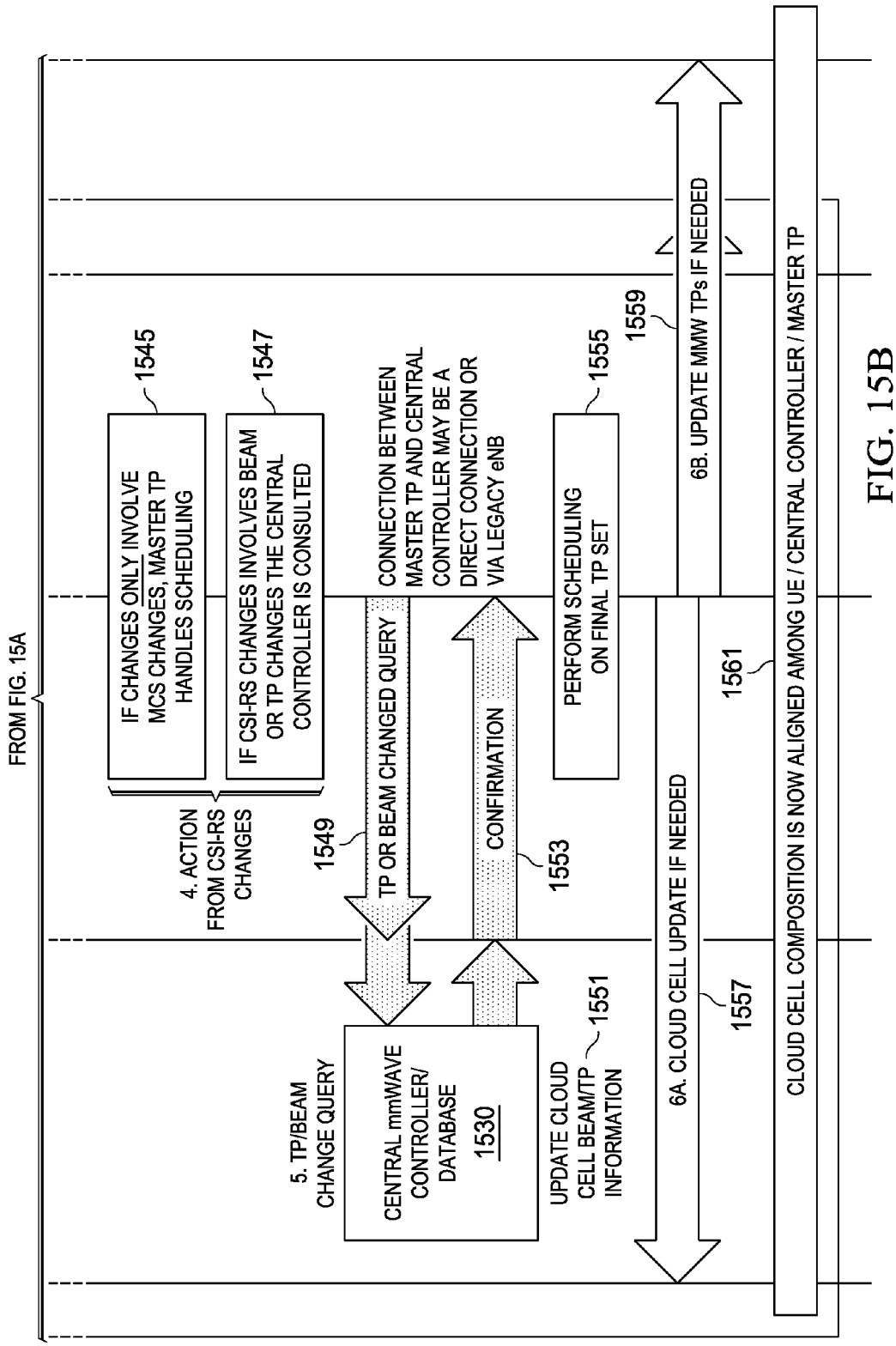

FIG. 15 illustrates a diagram 1500 highlighting messages exchanged and processing occurring in managing an mmWave UE centric cloud cell, highlighting feedback and signaling. Diagram 1500 illustrates messages exchanged and processing occurring in an mmWave UE 1505, a legacy eNB 1510, a master TP 1515, one or more slave TPs (e.g., TP1-N) 1520, an mmWave TPX 1525, and a central controller 1530.

After the forming of a mmWave UE centric cloud cell, the composition of the mmWave UE centric cloud cell is aligned along mmWave UE 1505, master TP 1515, and central controller 1530 (event 1535). mmWave UE 1505 participates in cloud cell communications with master TP 1515 and the one or more slave TPs 1520 (event 1537). mmWave UE 1505 reports CSI-RS measurements to master TP 1515 (event 1539). The CSI-RS measurements are of mmWave TPs that are within the synchronization window (or guard time) of mmWave UE 1505. mmWave UE 1505 may provide a preferred beam index (indices) (BI) and rank indicator (RI) for each mmWave TP in the measurement set (i.e., Set B), along with some form of identifier for each mmWave TP. The CSI-RS measurement reports may be signaled periodically according to a specified interval or they may be triggered by mmWave 1505. The signaling of the CSI-RS measurement reports may take place over the fast uplink control channel with master TP 1515 using the large uplink mmWave bandwidth that is available. There may be a plurality of CSI-RS measurement reporting modes, including:

CQI feedback per mmWave TP (includes mmWave TP identifying information, such as mmWave TP ID) for distributed MIMO operation; and One CQI feedback (based on an average CQI for the mmWave TPs in set B or just for master TP 1515) for diversity based operation.

Slave TPs 1520 also report measurement reports of the uplink received signal from the UE to the master TP 1515 (event 1541).

The CSI-RS status is updated at Master TP 1515—(CSI-RS status—block 1543). If the CSI-RS measurement reports indicate that only the assigned MCS for transmissions needs to be changed, master TP 1515 may initiate any associated changes by itself (block 1545). However, if the CSI-RS measurement reports indicate that the communications beams from the mmWave TPs needs to be changed or if the mmWave UE centric cloud cell needs to be changed, master TP 1515 may need to consult central controller 1530 to support the change (block 1547).

If master TP 1515 needs to consult central controller 1530, master TP 1515 sends a change query to central controller 1530 (event 1549). The change query may be regarding a possible change in the communications beam for a given mmWave TP or the composition of mmWave UE centric cloud cell (i.e, which mmWave TPs are in the cloud cell). If master TP 1515 is directly connected to central controller 1530, the change query may be sent directly to central controller 1530. If master TP 1515 is not directly connected to central controller 1530, the change query may be sent to legacy eNB 1510, which would serve as intermediary and send the change query to central controller 1530. Central controller 1530 updates a configuration for the communications beam and/or the mmWave UE centric cloud cell (event 1551) and sends a confirmation to master TP 1515 (event 1553). Once again, the confirmation may be sent directly to master TP 1515 or through legacy eNB 1510 depending on connectivity between central controller 1530 and master TP 1515.

Master TP 1515 schedules communications for the mmWave UE centric cloud cell (event 1555). If any updates to the mmWave UE centric cloud cell is needed, master TP 1515 updates central controller 1530 (event 1557) and mmWave TPs, including slave TPs 1520 and mmWave TPX 1525 (event 1559). The composition of the mmWave UE centric cloud cell is aligned along mmWave UE 1505, master TP 1515, and central controller 1530 (event 1561). Events and blocks 1539-1561 may be referred to as a CSI-RS monitoring loop 1563. Media Access Control (MAC) control elements may be used to modify member mmWave TPs of the mmWave UE centric cloud cell.

Figure 16:
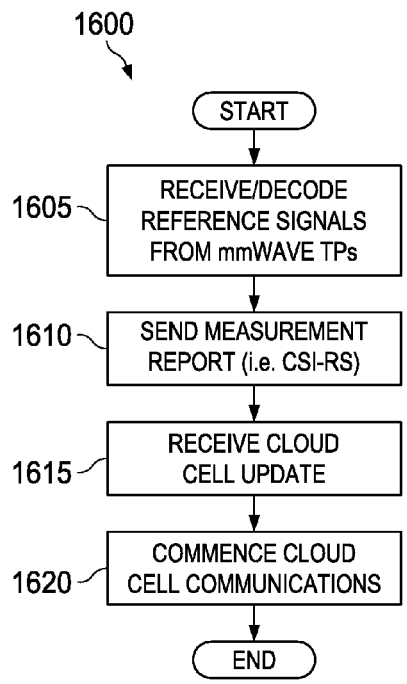
FIG. 16 illustrates a flow diagram of example operations occurring in an mmWave UE participating in managing an mmWave UE centric cloud cell according to example embodiments described herein.

FIG. 16 illustrates a flow diagram of example operations 1600 occurring in an mmWave UE participating in managing an mmWave UE centric cloud cell. Operations 1600 may be indicative of operations occurring in an mmWave UE participating in managing an mmWave UE centric cloud cell.

Operations 1600 begin with the mmWave UE receiving and decoding reference signals from mmWave TPs (block 1605). The mmWave UE may receive and decode synchronization signals from mmWave TPs and CSI-RS signals from mmWave TPs that are members of Set A, for example. Since the mmWave UE is downlink synchronized to the master TP, the mmWave UE can receive and decode the beam-formed CSI-RS of the mmWave TPs that are members of Set A. Additionally, the mmWave UE may determine and store a set of preferred receive transmission beam(s) for each mmWave TP. The mmWave TPs in Set A is potentially larger than the set of mmWave TPs to which the mmWave UE is currently connected (Set C) due to limitations in the number of receivers of the mmWave UE or scheduling restraints at the mmWave TPs, for example.

The mmWave UE sends measurement reports to the master TP (block 1610). The mmWave UE may periodically send the measurement reports as configured or if the mmWave UE notes that a change in the mmWave UE centric cloud set is warranted (based on the measurements) the mmWave UE may trigger the master TP to request an aperiodic measurement report from the mmWave UE by indicating an initiate CSI-RS report request flag in an uplink control signal. In the periodic reporting scenario, if the CQI reporting mode is set to CQI feedback per mmWave TP, the master mmWave TP receives the measurement reports and the central controller determines which mmWave TPs (based on the CQI reports, requested communications beams, mmWave TP availability, operating conditions, and so on) are to be included in an updated mmWave UE centric cloud cell.

The mmWave UE receives information regarding the updated mmWave UE centric cloud cell (block 1615). The information may include identifiers of the mmWave TPs in the updated mmWave UE centric cloud cell, as well as communications beam information. The mmWave UE commences mmWave UE centric cloud cell communications (block 1620).

Figure 17:
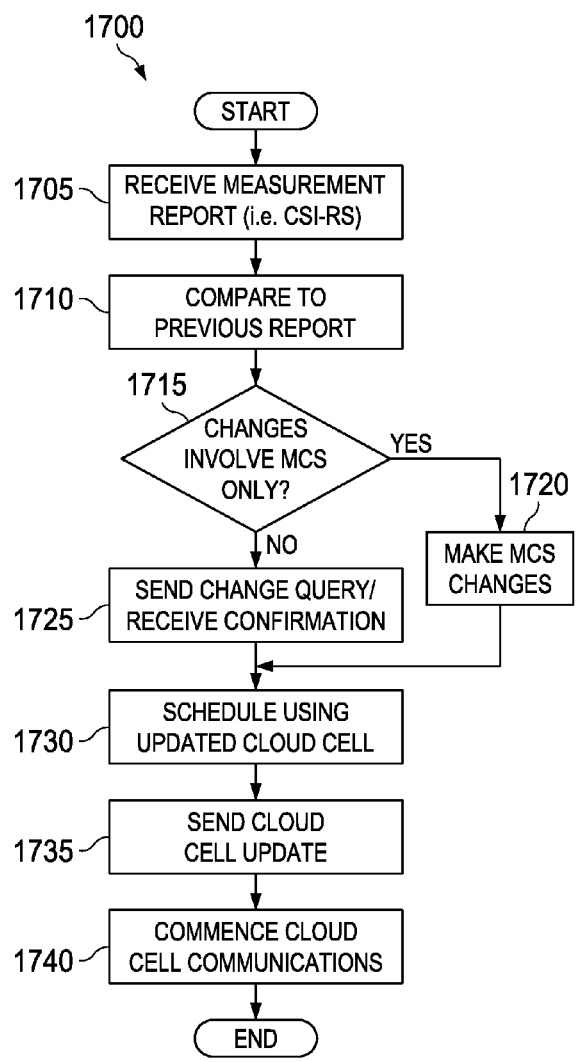
FIG. 17 illustrates a flow diagram of example operations occurring in a master TP participating in managing an mmWave UE centric cloud cell according to example embodiments described herein.

FIG. 17 illustrates a flow diagram of example operations 1700 occurring in a master TP participating in managing an mmWave UE centric cloud cell. Operations 1700 may be indicative of operations occurring in master TP participating in managing an mmWave UE centric cloud cell.

Operations 1700 begin with the master TP receiving measurement reports from the mmWave UE (block 1705). The measurement reports may be received periodically at regular intervals or the measurement reports may be triggered aperiodically by the mmWave UE. The master TP compares the measurement report to previous measurement reports (block 1710). If the measurement report has changed significantly, e.g., the CQI of one or more mmWave TPs has changed more than a threshold or a combined CQI for all mmWave TPs has changed more than a threshold, the master TP may determine that a change in the mmWave UE centric cloud cell is warranted. The master TP performs a check to determine if the change is limited to only changing the MCS (block 1715). If the change is limited to changing only the MCS, the master TP makes the change to the MCS (block 1720). If the change is not limited to changing only the MCS, for example, a change in communications beam for each mmWave TP or rank, the master TP sends a change query to the central controller and receives a confirmation from the central controller (block 1725). The change query may include the measurement reports (including CQI, Beam indices, and rank information for the mmWave TPs) and the confirmation may include changes to the mmWave UE centric cloud cell or an updated mmWave UE centric cloud cell.

The master TP schedules using the updated mmWave UE centric cloud cell (block 1730). If there have been changes to the mmWave TP configuration, the master TP sends a message updating the mmWave TPs regarding the updated mmWave UE centric cloud cell (block 1735). The master TP commences mmWave UE centric cloud cell communications (block 1740).

In some situations, it may be necessary to change the master TP of an mmWave UE centric cloud cell. As an illustrative example, if the mmWave UE detects that an mmWave TP that is a member of Set A has a stronger signal, e.g., CQI, than that of the master TP, then it may be desirable to make the mmWave TP the new master TP. As another illustrative example, the the communications channel between the master TP and the mmWave UE may have degraded, the communications channel may be blocked or partially blocked, the master TP may have failed, and so on. Depending upon which set (e.g., Sets A, B or C) the new mmWave TP (with the stronger signal) is in, there will be a different mechanism for making the new TP into a Master TP. For instance, if the newly detected mmWave TP with the stronger signal is in set C (the connected set), the central controller may not need to be first consulted (only subsequently informed), since this TP is already in the cloud cell as a slave TP. If however the new detected mmWave TP, is in Set A or B, the central controller may first need to be consulted since the newly detected mmWave TP is not yet in the connected set and has not yet been assigned to be in the mmWave UE centric cloud cell by the central controller.

Figure 18A:
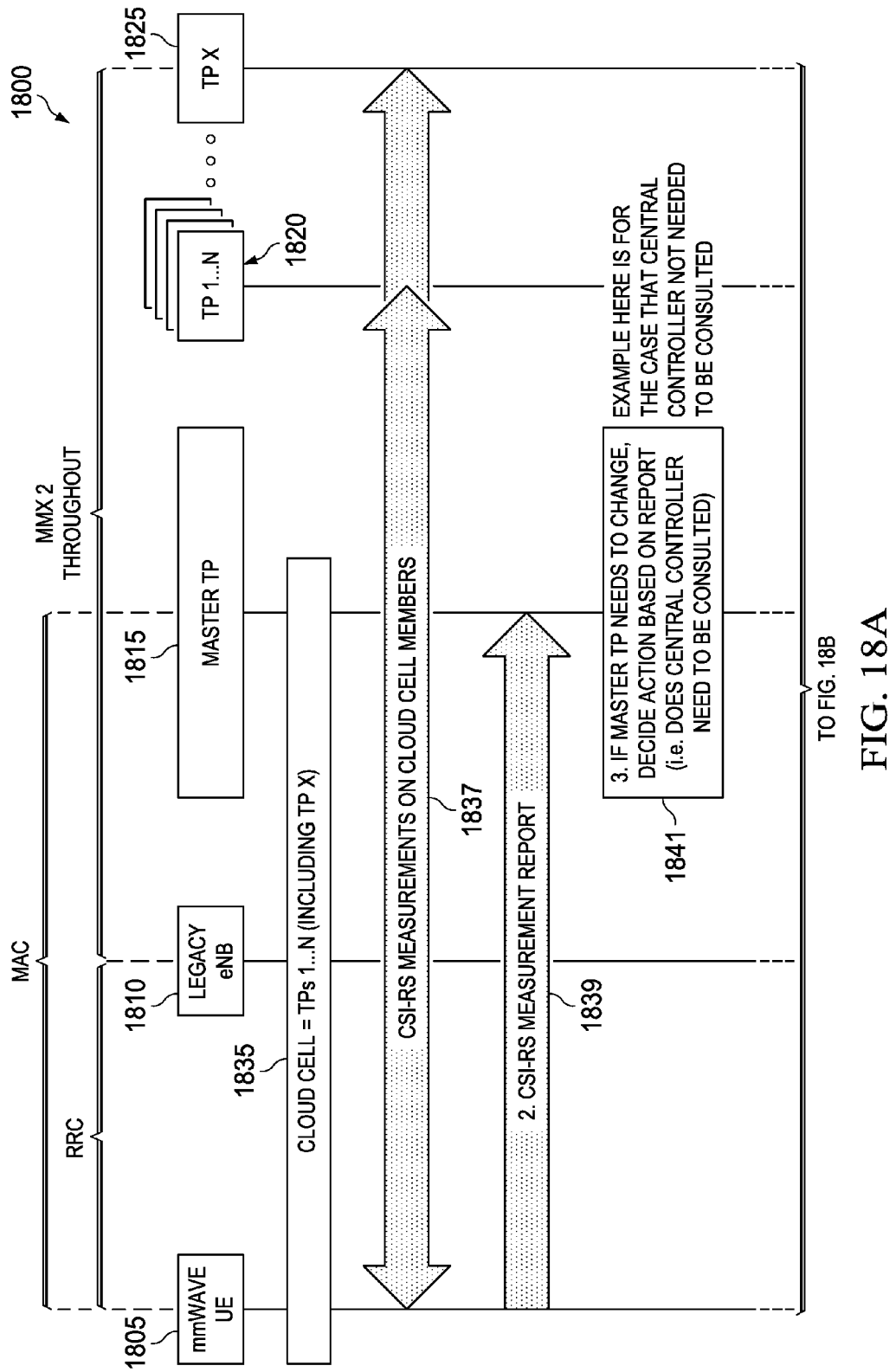
FIG. 18 illustrates a diagram highlighting first example messages exchanged and processing occurring in changing a master TP of an mmWave UE centric cloud cell according to example embodiments described herein.
Figure 18B:
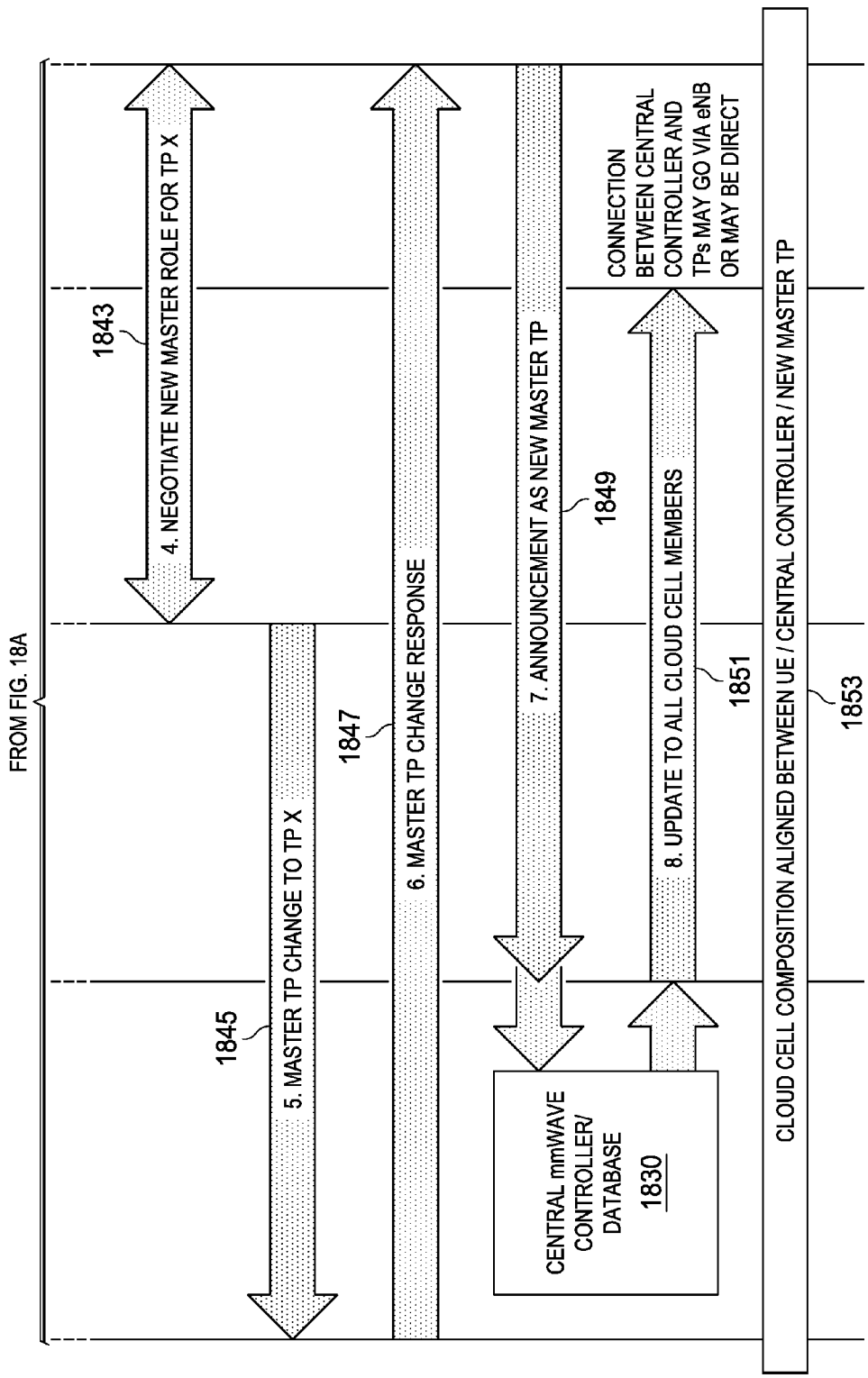

FIG. 18 illustrates a diagram 1800 highlighting first example messages exchanged and processing occurring in changing a master TP of an mmWave UE centric cloud cell for the case that the central controller does not need to be first consulted (i.e., this new master TP is already in the connected set C). Diagram 1800 illustrates messages exchanged and processing occurring in an mmWave UE 1805, a legacy eNB 1810, a master TP 1815, one or more slave TPs (e.g., TP1-N) 1820, an mmWave TPX 1825, and a central controller 1830.

After the forming of an mmWave UE centric cloud cell, the composition of the mmWave UE centric cloud cell includes master TP 1815 and slave TPs 1820, including mmWave TPX 1825 (block 1835). The mmWave UE measures CSI-RS transmissions made by the mmWave TPs of the mmWave UE centric cloud cell (event 1837) and reports the measurements (event 1839). As discussed previously, the measurements may be reported periodically at specified intervals. Alternatively, the mmWave UE may trigger a measurement report by setting a an initiate CSI-RS report request flag in an uplink control signal, causing the master TP to ask the mmWave UE for an aperiodic measurement report.

Master TP 1815 determines if central controller 1830 needs to be consulted regarding the master TP change (block 1841). (i.e., based on the ID of the newly detected mmWave TP, the master TP can determine if the newly detected mmWave TP is already in the connected set or not). A situation wherein central controller 1830 does not need to be consulted is illustrated in FIG. 18. If central controller 1830 needs to be consulted, master TP 1815 sends a query to central controller 1830 and central controller 1830 responds with a confirmation with an updated mmWave UE centric cloud cell.

For discussion purposes, consider a situation wherein mmWave TPX 1825 is to become the new master TP. Master TP 1815 and mmWave TPX 1825 negotiates a new master TP role for mmWave TPX 1825 (event 1843). Master TP 1815 signals to mmWave UE 1805 informing mmWave UE 1805 that mmWave TPX 1825 will become the new master TP (event 1845). mmWave UE 1805 signals a master TP change response to mmwave TPX 1825 (event 1847). The master TP change response may confirm the master TP change. mmWave TPX 1825, now the new master TP, signals an announcement announcing that it is the new master TP (event 1849). The announcement may be sent to legacy eNB 1810, which forwards the announcement to central controller 1830. Central controller 1830 updates all mmWave TPs in the updated mmWave UE centric cloud cell (event 1851). After the update, the composition of the mmWave UE centric cloud cell is aligned with mmWave UE 1805, legacy eNB 1810, central controller 1830, and the members of the mmWave UE centric cloud cell (block 1853).

It is noted that in a situation that warrants a master TP change, a communications channel between the master TP and an mmWave UE is likely to be weak or degraded. Although the procedure outlined in FIG. 18 will work, a more robust solution is available.

Figure 19:
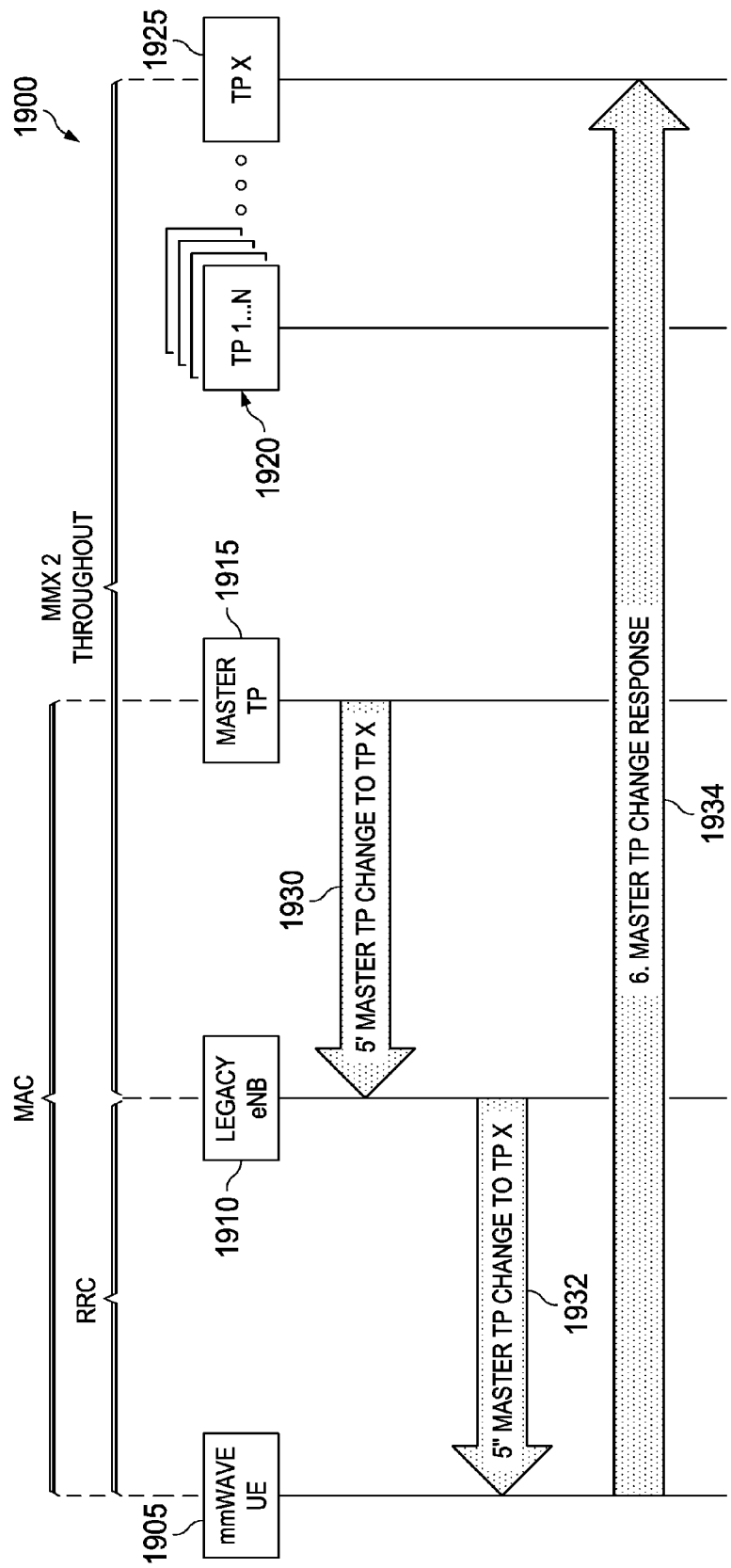
FIG. 19 illustrates a diagram highlighting second example messages exchanged and processing occurring in changing a master TP of an mmWave UE centric cloud cell according to example embodiments described herein.

FIG. 19 illustrates a diagram 1900 highlighting second example messages exchanged and processing occurring in changing a master TP of an mmWave UE centric cloud cell. Diagram 1900 illustrates messages exchanged and processing occurring in an mmWave UE 1905, a legacy eNB 1910, a master TP 1915, one or more slave TPs (e.g., TP1-N) 1920, and an mmWave TPX 1925.

The messages exchanged and processing shown in FIG. 19 may be representative of events occurring after master TP 1915 has determined that a master TP change should take place and master TP 1915 has negotiated the master TP change with mmWave TPX 1925. As an illustrative example, the messages exchanged and processing shown in FIG. 19 may occur after event 1843 of FIG. 18 and before event 1849 of FIG. 18.

Master TP 1915 sends a master TP change message to legacy eNB 1910 (event 1930). Since master TP 1915 and legacy eNB 1910 communicate via a high throughput low latency link, the condition of the link is very reliable. Legacy eNB 1910 forwards the master TP change message to mmWave UE 1905 via the legacy (i.e. via LTE) link (event 1932) which is much more reliable than the degraded (or potentially non-existent) mmWave link between mmWave master TP 1915 and mmWave UE 1905. mmWave UE 1905 signals a master TP change response to mmwave TPX 1925 (event 1934). The master TP change response may confirm the master TP change.

Figure 20A:
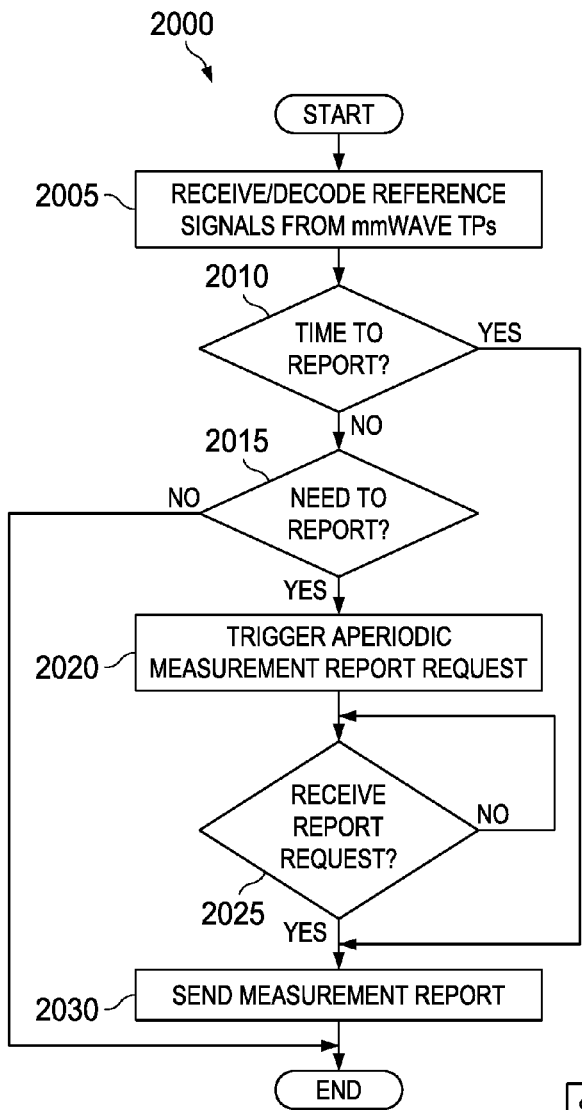
FIG. 20A illustrates a flow diagram of example operations occurring in an mmWave UE sending a measurement report according to example embodiments described herein.

FIG. 20A illustrates a flow diagram of example operations 2000 occurring in an mmWave UE sending a measurement report. Operations 2000 may be indicative of operations occurring in an mmWave UE sending a measurement report.

Operations 2000 begin with the mmWave UE receiving and decoding reference signals from mmWave TPs to measure the reference signals from TPs in Set A (block 2005). The mmWave UE performs a check to determine if it is time to report the measured reference signals (block 2010). In other words, is it time to make a periodic measurement report. If it is not time to report the measured reference signals, the mmWave UE performs a check to determine if it needs to report the measured reference signals (block 2015). As an illustrative example, the mmWave UE may determine that there needs to be a change in the communications beam direction, a change in the MCS for the present transmissions, and so on.

If there is a need to report the measured reference signals, the mmWave UE initiates an aperiodic measurement report request (block 2020). As an illustrative example, the mmWave UE triggers an aperiodic measurement report request by indicating an initiate CSI-RS report request flag in an uplink control signal. In this way, the example embodiments can reduce the latency associated with feeding back information, since in traditional communications systems, aperiodic measurement reports are normally triggered only by a serving TP. The mmWave UE performs a check to determine if it has received an aperiodic report request from the Master TP (block 2025). If the mmWave UE has not received a report request, the mmWave UE may continue to wait for the report request (by returning to block 2025) or operations 2000 may terminate, depending on implementation. If the mmWave UE has received a report request, the mmWave UE sends a measurement report (block 2030). If the measure reference signal for one of the measured mmWave TPs is not better than the measured reference signal for the master TP (or if none of the other feedback parameters have changed), then operations 2000 may terminate. If it is time to report the measured reference signals (block 2010), the mmWave UE sends a measurement report (block 2030).

Figure 20B:
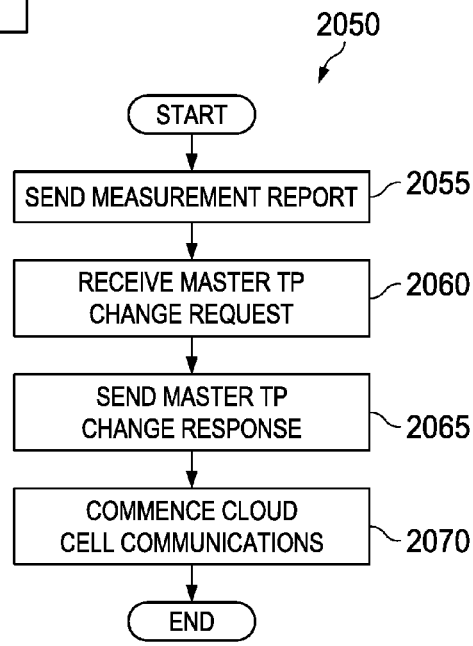
FIG. 20B illustrates a flow diagram of example operations occurring in an mmWave UE participating in a master TP change according to example embodiments described herein.

FIG. 20B illustrates a flow diagram of example operations 2050 occurring in an mmWave UE participating in a master TP change. Operations 2000 may be indicative of operations occurring in an mmWave UE participating in a master TP change.

Operations 2050 begin with the mmWave UE sending a measurement report (block 2055). The mmWave UE receives a master TP change request (block 2060). The master TP change request may be received from the master TP or from the legacy eNB. The mmWave UE sends a master TP change response to an mmWave TP that will become the new master TP and synchronizes to the new Master TP (block 2065). The mmWave UE commences mmWave UE centric cloud cell communications (block 2070).

Figure 21:
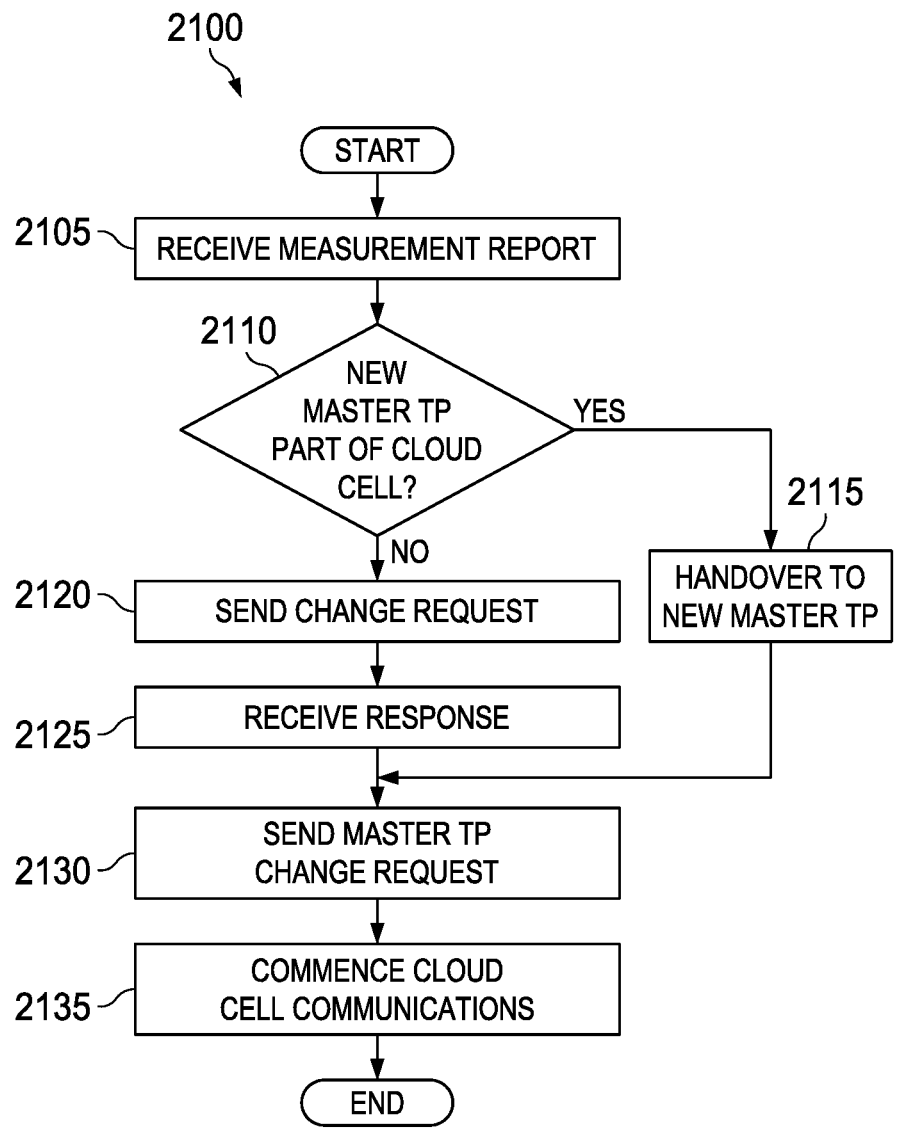
FIG. 21 illustrates a flow diagram of example operations occurring in a master TP participating in a master TP change according to example embodiments described herein.

FIG. 21 illustrates a flow diagram of example operations 2100 occurring in a master TP participating in a master TP change. Operations 2100 may be indicative of operations occurring in a master TP participating in a master TP change.

Operations 2100 begin with the master TP receiving a measurement report from the mmWave UE (block 2105). The measurement report may be a regular periodic measurement report or the measurement report may be an aperiodic report triggered by the master TP after receiving uplink control information with an initiate CSI-RS report request flag that is set to a specified value. The master TP performs a check to determine if the mmWave TP that will become the new master TP is part of the mmWave UE centric cloud cell (block 2110). If the mmWave TP is part of the mmWave UE centric cloud cell, the master TP and the mmWave TP participate in a handover and the mmWave TP becomes the new master TP (block 2115). It is noted that if the communications beam(s) need to change, the central controller may need to be consulted even if the mmWave TP is part of the mmWave UE centric cloud cell.

If the mmWave TP is not part of the mmWave UE centric cloud cell, the master TP sends a change request to the central controller to determine if the mmWave TP is available (block 2120). The master TP receives a response from the central controller (block 2125). After the handover has been completed or after receiving the response from the central controller, the former master TP sends a master TP change request to the mmWave UE to inform the mmWave UE about the master TP change (block 2130). The former master TP commences mmWave UE centric cloud cell communications (block 2135).

Figure 22:
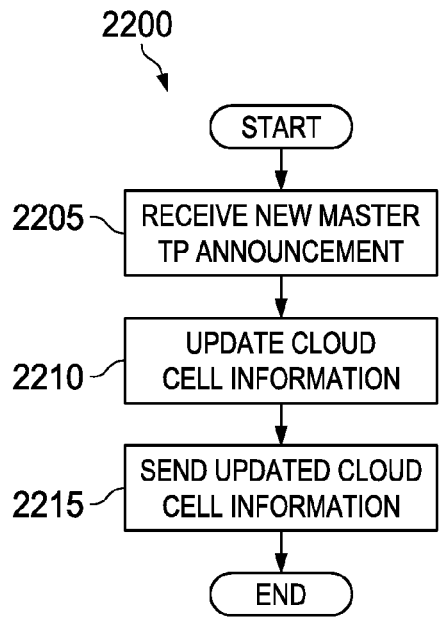
FIG. 22 illustrates a flow diagram of example operations occurring in a central controller being informed of a master TP change according to example embodiments described herein.

FIG. 22 illustrates a flow diagram of example operations 2200 occurring in a central controller being informed of a master TP change. Operations 2200 may be indicative of operations occurring in a central controller being informed of a master TP change when a slave TP becomes a master TP.

Operations 2200 begin with the central controller receiving a new master TP announcement (block 2205). The new master TP may be received from the new master TP of the mmWave UE centric cloud cell. The central controller updates information about the mmWave UE centric cloud cell (block 2210). The information may be stored in a database. The central controller sends information about the updated mmWave UE centric cloud cell (block 2215). The information about the updated mmWave UE centric cloud cell may be sent to the member mmWave TPs of the updated mmWave UE centric cloud cell.

Figure 23:
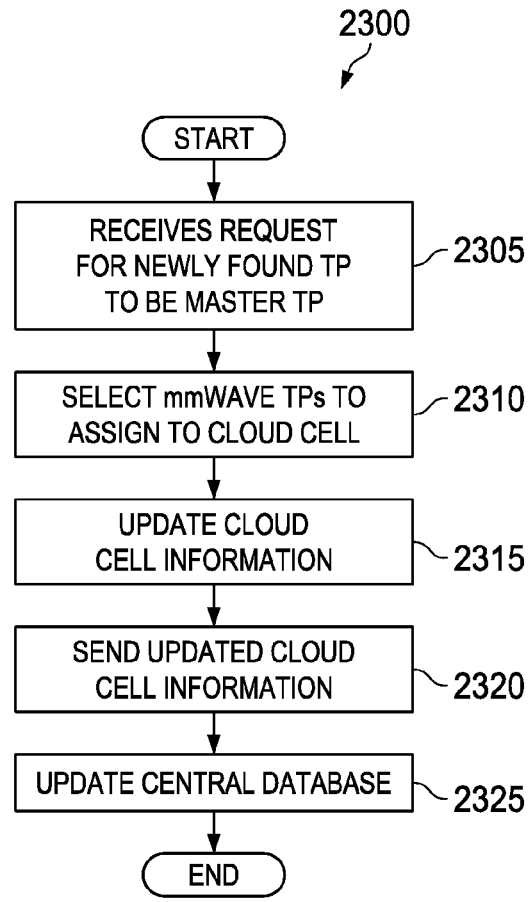
FIG. 23 illustrates a flow diagram of example operations occurring in a central controller participating in a master TP change when a non-slave mmWave TP becomes a master TP according to example embodiments described herein.

FIG. 23 illustrates a flow diagram of example operations 2300 occurring in a central controller participating in a master TP change when a non-slave mmWave TP becomes a master TP. Operations 2300 may be indicative of operations occurring in a central controller participating in a master TP change. The non-slave TP subsequently becomes a new master TP.

Operations 2300 begin with the central controller receiving a request to have a newly found mmWave TP become a master TP (block 2305). The newly found mmWave TP in this instance is a non-slave TP. In other words, the newly found mmWave TP is not a member of the mmWave UE's mmWave UE centric cloud cell. The central controller, may select the mmWave TPs in accordance with a central database and selection information (i.e., the requested communications beams, mmWave TP capabilities, mmWave TP load, mmWave UE capabilities, interference condition, and so on) (block 2310). The central controller updates information about the mmWave UE centric cloud cell (block 2315). The central controller sends the updated information (block 2320). The update information may be sent to the mmWave UE, as well as the members of the mmWave UE centric cloud cell. The central controller updates information in the central database regarding the mmWave UE centric cloud cell (block 2325).

As discussed previously, a mmWave UE may be configured to provide either one CQI feedback per reported mmWave TP (i.e., Set B) or one CQI feedback for the mmWave TPs (where the average CQI is for all of the reported mmWave TPs (i.e., Set B), all of the mmWave TPs in the connected set (i.e., Set C), or another set of mmWave TPs determined by the master TP). It is noted that when the mmWave UE is configured to perform one CQI feedback for the mmWave TPs, the final transmission will be a diversity type transmission with the mmWave TPs sending the same data stream and using the same MCS. However, if the mmWave UE is configured to perform one CQI feedback per mmWave TP, the UE may select communications beams for the mmWave TPs (i.e., using the beam-index (BI) in the CSI-RS measurement report) for downlink transmission which are received using the same receive communications beams at the mmWave UE. When this occurs, the mmWave TPs should not use classic distributed MIMO transmission since the mmWave UE may not be able to distinguish the different signals sent at the same time and frequency from the mmWave TPs. Therefore, the mmWave UE measurement report may include a one bit transmission mode flag where:

'0'—Mode 0—transmit diversity or transmit distributed MIMO on different subbands, '1'—Mode 1—classic distributed MIMO (same subband).

To indicate what the transmission mode should be for the beam indices which it has feedback to the master TP.

Since mmWave links are fragile and in high mobility situations, the mmWave UE (or legacy eNB) may choose to drop mmWave connectivity altogether and use only legacy communications, (i.e., LTE) situations may arise when a smooth master TP change may not possible.

A number of scenarios are considered:

The mmWave UE is in a completely different coverage area and the responsible central controller for this new coverage area is different from the central controller of the coverage area where the mmWave UE was last connected at mmWave frequencies. In this scenario, the mmWave UE centric cloud cell may need to be configured totally from the beginning again using an mmWave UE centric cloud cell formation request, as illustrated in FIG. 7.

The mmWave UE is still served by the same central controller. In order to quickly re-establish the mmWave UE centric cloud cell, the mmWave UE may send a control link failure report and send a mmWave UE centric cloud cell re-formation request over the legacy uplink control channel so that the mmWave UE centric cloud cell can be quickly re-formed using the most recently saved data at the central controller (or central database). If the mmWave UE provides additional information in the control link failure report, the central controller may make an intelligent decision as to how to re-form the mmWave UE centric cloud cell in accordance with previous measurements.

Figure 24A:
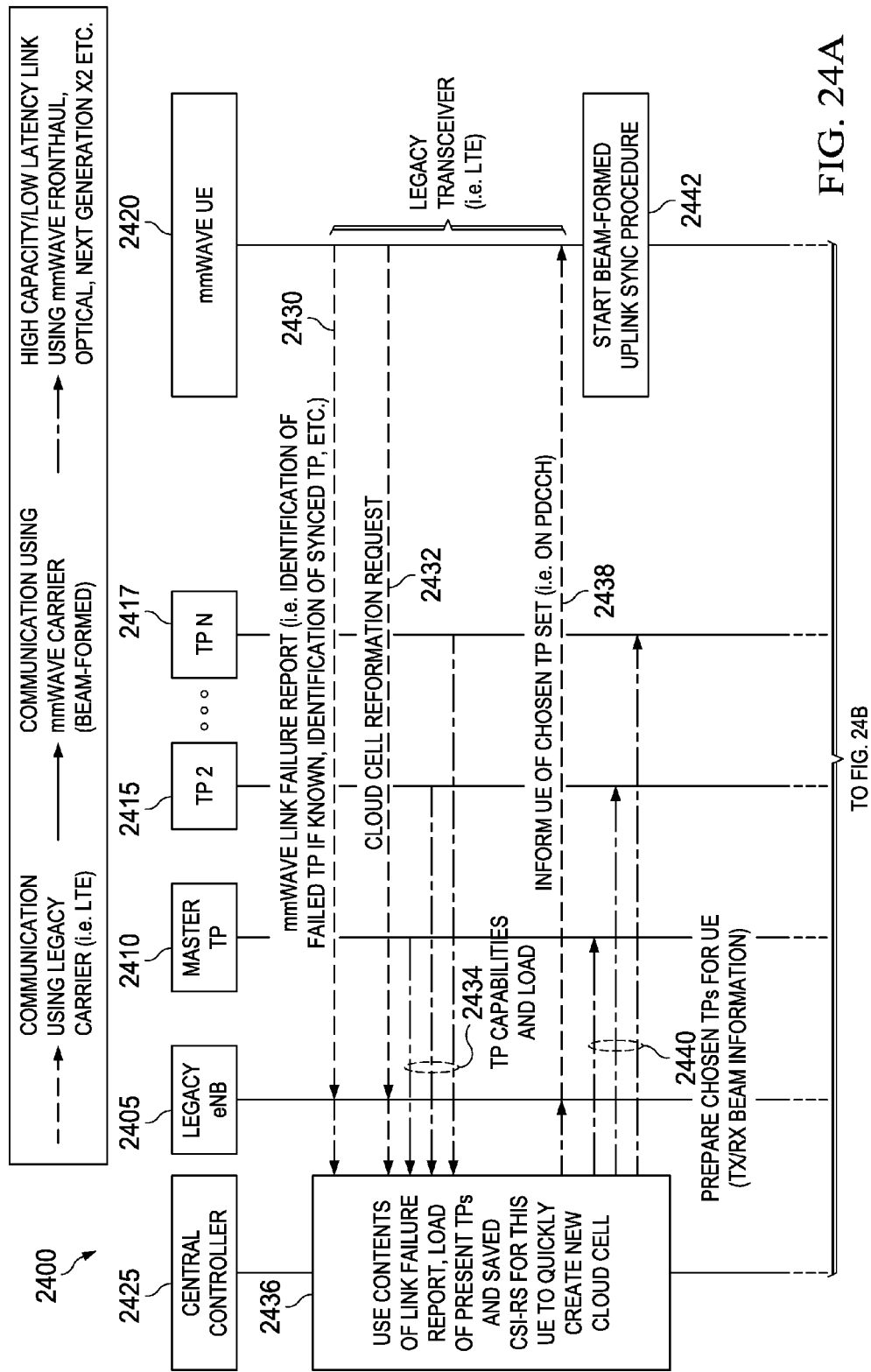
FIG. 24 illustrates a diagram highlighting messages exchanged and processing occurring in a re-forming of an mmWave UE centric cloud cell, where the mmWave UE remains served by the same central controller after mmWave UE centric cloud cell reformation according to example embodiments described herein.
Figure 24B:
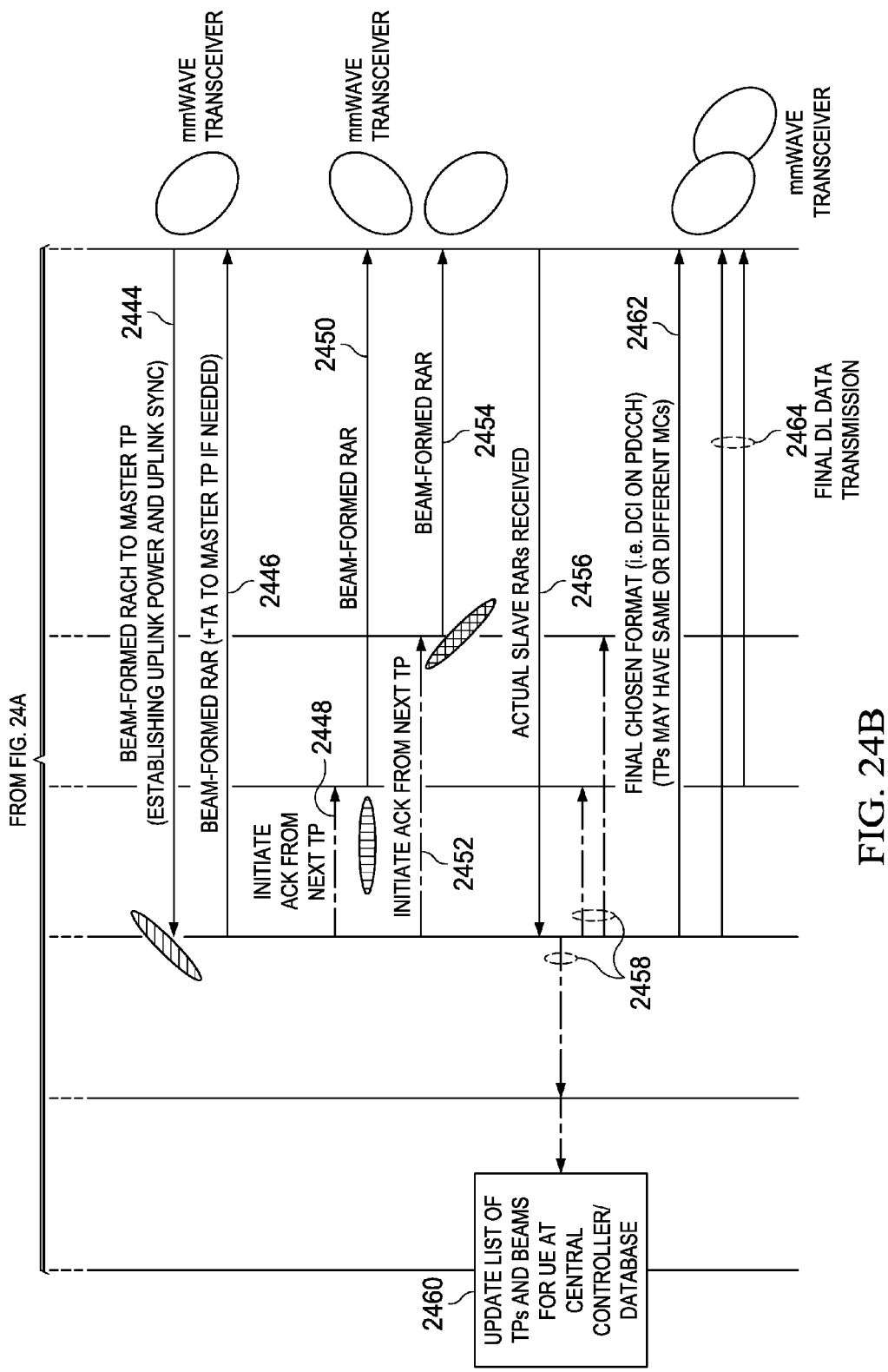

FIG. 24 illustrates a diagram 2400 highlighting messages exchanged and processing occurring in a re-forming of an mmWave UE centric cloud cell, where the mmWave UE remains served by the same central controller after mmWave UE centric cloud cell reformation. Diagram 2400 illustrates messages exchanged and processing occurring in a legacy eNB 2405, a master TP 2410, one or more slave TPs (e.g., TP2 2415 and TPN 2417), an mmWave UE 2420, and a central controller 2425.

mmWave UE 2420 determines that an mmWave link has failed and sends a mmWave link failure report (event 2430). The mmWave link may have failed if the received mmWave signal quality from the Master TP drops below a specified threshold (before a hand over to a new Master TP can complete), if the mmWave TP (i.e., the master TP) fails, the UE moves out of range, and so on, for example. The mmWave link failure report may include an identifier, e.g., mmWave TP ID, of the mmWave TP whose link failed (i.e., failed Master TP) (if known), an identifier (ID) of a mmWave TP to which the TP is currently down linked synchronized with (effectively the new Master TP for that UE), and so on. If mmWave UE 2420 provides the identifier of the synchronized mmWave TP and any information regarding the mmWave TP where control connectivity was lost in the mmWave link failure report, a new mmWave UE centric cloud cell may be quickly re-established. The mmWave link failure report may be sent to legacy eNB 2405, which forwards the mmWave link failure report to central controller 2425. The mmWave UE 2420 sends an mmWave UE centric cloud cell reformation request (event 2432). The mmWave UE centric cloud cell reformation request may be sent to central controller 2425. Central controller 2425 will be informed of all of the mmWave TPs capability and load information (event 2434) to which it is connected to, or to which it is serving.

Central controller 2425 selects a new mmWave UE centric cloud cell for mmWave UE 2420 (block 2436). The new mmWave UE centric cloud cell may be formed in accordance with the mmWave TP capabilities and load information provided by the mmWave TPs. The new mmWave UE centric cloud cell may also be formed in accordance with the mmWave TPs in the previous mmWave UE centric cloud cell, as well as information included in the wwWave link failure report and saved CSI-RS measurement reports from mmWave UE. Central controller 2425 sends mmWave UE 2420 (by way of legacy connection (i.e., LTE) to eNB 2405) a message informing mmWave UE 2420 information about the new mmWave UE centric cloud cell formed (event 2438). Central controller 2425 prepares the mmWave TPs in the new mmWave UE centric cloud cell for communications with mmWave UE 2420 (events 2440).

mmWave UE 2420 starts a beam-formed uplink synchronization procedure (event 2442). The beam-formed uplink synchronization procedure may include mmWave UE 2420 initiating a beam-formed RACH with master TP 2410 (event 2444). The beam-formed RACH may result in mmWave UE 2420 determining uplink transmit power and establishing uplink synchronization with master TP 2410. If the beam-formed RACH is correctly received at the Master TP 2410, the Master TP sends a beam-formed RAR to mmWave UE 2420 (event 2446). Master TP 2410 may also send timing advance information to mmWave UE 2420 if needed. In an unlikely event that central controller 2425 does not assign the strongest mmWave TP to the mmWave UE centric cloud cell, mmWave UE 2420 may first synchronize with a master TP assigned by central controller 2425 (which is different from the strongest mmWave TP found by mmWave UE 2420, repeat the CSI-RS measurements and repeat its mmWave UE centric cloud cell formation request or may follow the procedure illustrated in FIG. 13.

Master TP 2410 correctly receives a beam-formed RACH from the mmWave UE, it initiates an acknowledgement from the slave TPs of the set of mmWave TPs in the order that the CQI knowledge of the different TP is stored at the central controller Master TP 2410 initiates an acknowledgement from slave TP 2415 (event 2448). Slave TP 2415 then sends a beam-formed RAR to mmWave UE 2420 (event 2450). Master TP 2410 then initiates an acknowledgement from slave TP 2417 (event 2452). Slave TP 2417 then sends a beam-formed RAR to mmWave UE 2420 (event 2454). mmWave UE 2420 informs master TP 2410 about the RARs received from the slave TPs (event 2456). Master TP 2410 informs central controller 2425 by way of legacy eNB 2405 (events 2458), as well as the slave TPs (events 2458), about the RARs received by mmWave UE 2420. Central controller 2425 updates the central database based on information received about the RARs received by mmWave UE 2420. Central controller 2425 may update a list of TPs assigned to mmWave UE centric cloud cell operation, associated communications beams, and so on (event 2460).

Master TP 2410 signals mmWave UE 2420 information regarding transmission format or parameters (event 2462). The transmission format or parameters may include DCI signaled on a PDCCH. It is noted that different TPs (master TP 2410 as well as slave TPs) may have the same or different MCS. The TPs (master TP 2410 as well as slave TPs) transmit downlink data to mmWave UE 2420 (events 2464).

Figure 25:
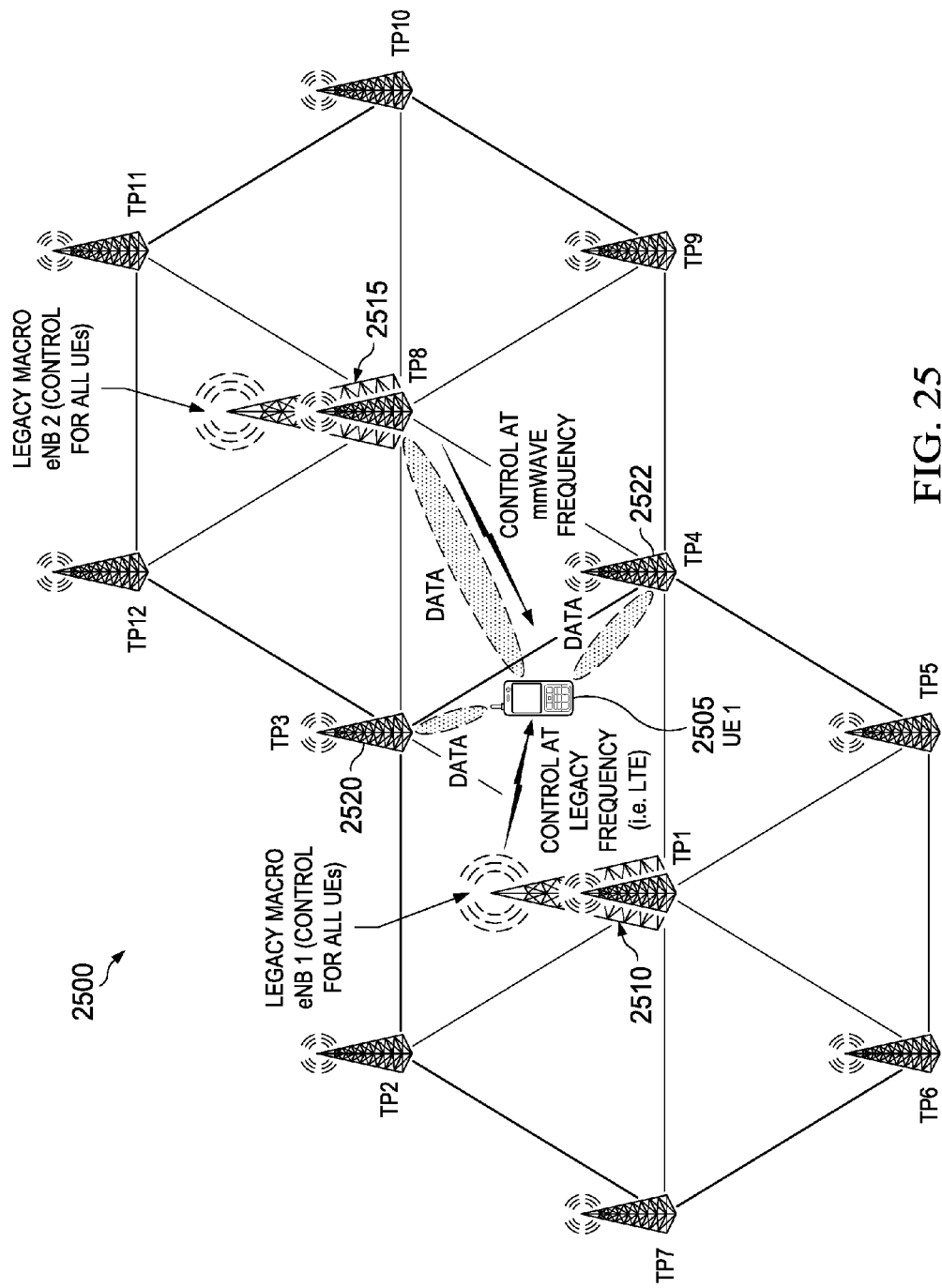
FIG. 25 illustrates a communications system wherein an mmWave UE is served by a mmWave UE centric cloud cell with mmWave TPs that span multiple legacy eNB coverage areas according to example embodiments described herein.

In general, a central controller controls the mmWave TPs operating in the coverage area of at least one legacy eNB. However, if a central controller is able to control a set of mmWave TPs that span the coverage areas of a plurality of legacy eNBs, issues arising when mmWave TPs of an mmWave UE centric cloud cell span multiple legacy eNB boundaries and when control channels are located in different legacy eNB coverage areas do not occur. FIG. 25 illustrates a communications system 2500 wherein an mmWave UE is served by a mmWave UE centric cloud cell with mmWave TPs that span multiple legacy eNB coverage areas. As shown in FIG. 25, mmWave UE 2505 is receiving a first control channel from legacy eNB 2510, a second control channel from mmWave TP 2515, and data from mmWave TP 2515, mmWave TP 2520, and mmWave TP 2522. The mmWave UE is simultaneously connected to the legacy eNB and to the master TP. The mmWave UE centric cloud cell spans the coverage areas of two legacy eNBs. In order to facilitate mmWave UE centric cloud cell operation across legacy eNB coverage areas, mmWave TPs across eNB coverage areas will be connected. However, the contents of the central controller associated with each mmWave UE may have to be moved (copied) over to the adjacent central controller when the mmWave UE centric cloud cell is served by the new central controller (the adjacent central controller). The handover from one central controller to another should be independent of a normal legacy eNB to legacy eNB handover.

According to an example embodiment, the fast control channel link (either uplink or downlink or both) may be transported between the mmWave UE and more than one of the mmWave TPs of the mmWave UE centric cloud cell, as opposed to just using the Master mmWave TP. The fast control channel link being received and/or sent by more than one mmWave TP offers the benefits of spatial diversity to the fast control channel, making the fast control channel more immune to link fragility.

According to an example embodiment, in the situation wherein a fast uplink control channel link to more than mmWave TPs of the mmWave UE centric cloud cell is implemented, the multiple uplink control channels are combined at a single mmWave TP, e.g., the master TP.

According to an example embodiment, in the situation wherein a fast downlink control channel link from more than mmWave TPs of the mmWave UE centric cloud cell is implemented, the multiple downlink control channels are combined at the mmWave UE.

Figure 26:
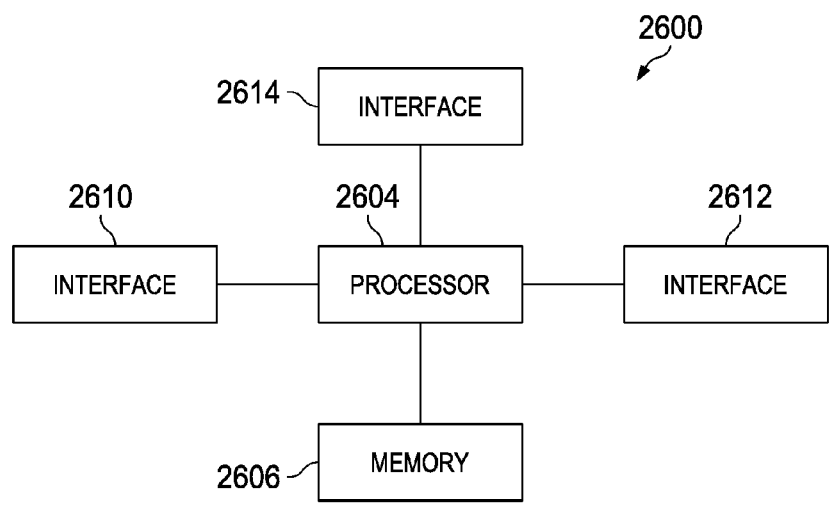
FIG. 26 illustrates a block diagram of an embodiment processing system for performing methods described herein.

FIG. 26 illustrates a block diagram of an embodiment processing system 2600 for performing methods described herein, which may be installed in a host device. As shown, the processing system 2600 includes a processor 2604, a memory 2606, and interfaces 2610-2614, which may (or may not) be arranged as shown in FIG. 26. The processor 2604 may be any component or collection of components adapted to perform computations and/or other processing related tasks, and the memory 2606 may be any component or collection of components adapted to store programming and/or instructions for execution by the processor 2604. In an embodiment, the memory 2606 includes a non-transitory computer readable medium. The interfaces 2610, 2612, 2614 may be any component or collection of components that allow the processing system 2600 to communicate with other devices/components and/or a user. For example, one or more of the interfaces 2610, 2612, 2614 may be adapted to communicate data, control, or management messages from the processor 2604 to applications installed on the host device and/or a remote device. As another example, one or more of the interfaces 2610, 2612, 2614 may be adapted to allow a user or user device (e.g., personal computer (PC), etc.) to interact/communicate with the processing system 2600. The processing system 600 may include additional components not depicted in FIG. 26, such as long term storage (e.g., non-volatile memory, etc.).

In some embodiments, the processing system 2600 is included in a network device that is accessing, or part otherwise of, a telecommunications network. In one example, the processing system 2600 is in a network-side device in a wireless or wireline telecommunications network, such as a base station, a relay station, a scheduler, a controller, a gateway, a router, an applications server, or any other device in the telecommunications network. In other embodiments, the processing system 2600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 27:
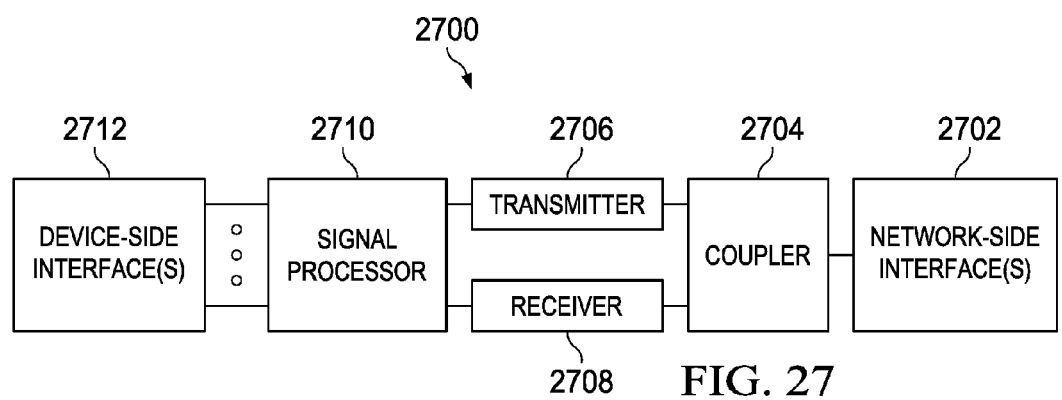
FIG. 27 illustrates a block diagram of a transceiver adapted to transmit and receive signaling over a telecommunications network according to example embodiments described herein.

In some embodiments, one or more of the interfaces 2610, 2612, 2614 connects the processing system 2600 to a transceiver adapted to transmit and receive signaling over the telecommunications network. FIG. 27 illustrates a block diagram of a transceiver 2700 adapted to transmit and receive signaling over a telecommunications network. The transceiver 2700 may be installed in a host device. As shown, the transceiver 2700 comprises a network-side interface 2702, a coupler 2704, a transmitter 2706, a receiver 2708, a signal processor 2710, and a device-side interface 2712. The network-side interface 2702 may include any component or collection of components adapted to transmit or receive signaling over a wireless or wireline telecommunications network. The coupler 2704 may include any component or collection of components adapted to facilitate bi-directional communication over the network-side interface 2702. The transmitter 2706 may include any component or collection of components (e.g., up-converter, power amplifier, etc.) adapted to convert a baseband signal into a modulated carrier signal suitable for transmission over the network-side interface 2702. The receiver 2708 may include any component or collection of components (e.g., down-converter, low noise amplifier, etc.) adapted to convert a carrier signal received over the network-side interface 2702 into a baseband signal. The signal processor 2710 may include any component or collection of components adapted to convert a baseband signal into a data signal suitable for communication over the device-side interface(s) 2712, or vice-versa. The device-side interface(s) 2712 may include any component or collection of components adapted to communicate data-signals between the signal processor 2710 and components within the host device (e.g., the processing system 2600, local area network (LAN) ports, etc.).

The transceiver 2700 may transmit and receive signaling over any type of communications medium. In some embodiments, the transceiver 2700 transmits and receives signaling over a wireless medium. For example, the transceiver 2700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2702 comprises one or more antenna/radiating elements. For example, the network-side interface 2702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure and its advantages have been described in detail, it should be understood that various changes, substitutions and alterations can be made herein without departing from the spirit and scope of the disclosure as defined by the appended claims.

What is claimed is:

1. A method comprising:
   measuring, by a user equipment (UE), signal strength of beam-formed reference signals transmitted by a plurality of transmission points (TPs);
   sending, by the UE, a request comprising information identifying first TPs having strongest respective signal strengths;
   receiving, by the UE, a request response including information regarding a subset of the first TPs, where the subset of the first TPs includes a first transmission point (TP) serving as a master TP and a second TP serving as a slave TP; and
   establishing, by the UE, a cloud cell with TPs of the subset of the first TPs, the establishing including establishing a data connection with the slave TP and establishing at least a control connection with the master TP, the UE being simultaneously connected to a legacy eNB and to the master TP.

2. The method of claim 1, further comprising:
   measuring, by the UE, TP specific signals transmitted by the plurality of TPs; and
   establishing, by the UE, downlink synchronization with an TP associated with a strongest measured TP specific signal.

3. The method of claim 2, wherein the TP specific signals comprise at least one of broadcast channels or synchronization signals.

4. The method of claim 1, wherein the beam-formed reference signals comprise beam-formed channel state information reference signals (CSI-RSs).

5. The method of claim 1, wherein measuring the signal strength of the beam-formed reference signals comprises:
   for each TP of the plurality of TPs, measuring signal strength of a plurality of beam-formed reference signals transmitted by the TP using a plurality of receive beams.

6. The method of claim 1, wherein establishing the cloud cell comprises:
   sending a beam-formed random access channel (RACH) to the master TP;
   receiving a beam-formed RACH response (RAR) from the master TP, thereby forming the control connection with the master TP;
   receiving a beam-formed RAR from the slave TP;
   sending information regarding RARs received to the master TP; and
   receiving information regarding transmission parameters from the master TP.

7. The method of claim 6, wherein there are a plurality of slave TPs, and wherein establishing the cloud cell comprises receiving beam-formed RARs from each one of the plurality of slave TPs.

8. The method of claim 1, wherein establishing the cloud cell comprises:
sending a beam-formed random access channel (RACH) to the master TP;
sending a no RAR received message when no RAR is received from the master TP;
receiving a response including information associated with a set of new TPs selected by a central controller, where the set of new TPs includes a third TP serving as a new master TP and a fourth TP serving as a new slave TP; and
establishing a cloud cell with TPs of the set of new TPs selected by the central controller, where a data connection is established with the new slave TP and at least a control connection is established with the new master TP.

9. The method of claim 1, wherein sending the request comprises:
sending the request to a legacy evolved NodeB (eNB) to trigger a forwarding of the request to a central controller.

10. A method comprising:
receiving, by a central controller, a request including information identifying first transmission points (TPs) having strongest respective signal strengths;
selecting, by the central controller, a subset of the first TPs, where the subset of the first TPs includes a transmission point (TP) serving as a master TP and a TP serving as a slave TP; and
sending, by the central controller, a response, identifying the subset of the first TPs, to a legacy evolved NodeB (eNB) to trigger a forwarding of the response to a user equipment (UE).

11. The method of claim 10, wherein selecting the subset of the first TPs further comprises selecting the subset of the first TPs based one or more of respective capabilities, loads, UE capabilities, or interference conditions of the first TPs.

12. The method of claim 10, further comprising updating, by the central controller, a central database in accordance with the subset of the first TPs.

13. A method comprising:
performing, by a first transmission point (TP), an uplink synchronization with a user equipment (UE);
initiating, by the first TP, acknowledgements from second TPs to the UE to trigger beam-formed random access channel responses (RARs) to the UE;
receiving, by the first TP, an information regarding a number of RARs received by the UE; and
sending, by the first TP, information regarding selected transmission parameters to the UE.

14. The method of claim 13, wherein performing the uplink synchronization comprises:
receiving a beam-formed random access channel (RACH) from the UE; and
sending a beam-formed RAR to the UE.

15. The method of claim 14, wherein the beam-formed RAR includes timing advance information.

16. The method of claim 14, further comprising:
sending, by the first TP, information regarding the number of RARs received by the UE to a central controller; and
sending, by the first TP, information regarding the number of RARs received by the UE to the second TPs.

17. A user equipment (UE) comprising:
a non-transitory memory storage comprising instructions; and
a processor in communication with the memory storage, wherein the processor executes the instructions to:
measure signal strength of beam-formed reference signals transmitted by a plurality of transmission points (TPs),
send a request comprising information identifying first TPs having strongest respective signal strengths,
receive a request response including information regarding a subset of the first TPs, where the subset of the first TPs includes a first transmission point (TP) serving as a master TP and a second TP serving as a slave TP, and
establish a cloud cell with TPs of the subset of the first TPs, wherein a data connection is established with the slave TP and at least a control connection is established with the master TP, and wherein the UE is simultaneously connected to a legacy eNB and to the master TP.

18. The UE of claim 17, wherein the processor executes the instructions to measure TP specific signals transmitted by the plurality of TPs, and establish downlink synchronization with an TP associated with a strongest measured TP specific signal.

19. The UE of claim 17, wherein the processor executes the instructions to, for each TP of the plurality of TPs, measure signal strength of a plurality of beam-formed reference signals transmitted by the TP using a plurality of receive beams.

20. The UE of claim 17, wherein the processor executes the instructions to send a beam-formed random access channel (RACH) to the master TP, receive a beam-formed RACH response (RAR) from the master TP, thereby forming the control connection with the master TP, receive a beam-formed RAR from the slave TP, send information regarding RARs received to the master TP, and receive information regarding transmission parameters from the master TP.

21. The UE of claim 20, wherein there are a plurality of slave TPs, and wherein the processor executes the instructions to receive beam-formed RARs from each one of the plurality of slave TPs.

22. The UE of claim 17, wherein the processor executes the instructions to send a beam-formed random access channel (RACH) to the master TP, send a no RAR received message when no RAR is received from the master TP, receive a response including information associated with a set of new TPs selected by a central controller, where the set of new TPs includes a third TP serving as a new master TP and a fourth TP serving as a new slave TP, and establish a cloud cell with TPs of the set of new TPs selected by the central controller, where a data connection is established with the new slave TP and at least a control connection is established with the new master TP.

23. The UE of claim 17, wherein the processor executes the instructions to send the request to a legacy evolved NodeB (eNB) to trigger a forwarding of the request to a central controller.

24. A central controller comprising:
a non-transitory memory storage comprising instructions; and
a processor in communication with the memory storage, wherein the processor executes the instructions to:
receive a request including information identifying first transmission points (TPs) having strongest respective signal strengths, select a subset of the first TPs, where the subset of the first TPs includes a transmission point (TP) serving as a master TP and a TP serving as a slave TP, and send a response, identifying the subset of the first TPs, to a legacy evolved NodeB (eNB) to trigger a forwarding of the response to a user equipment (UE).

25. The central controller of claim 24, wherein the processor executes the instructions to select the subset of the first TPs based one or more of respective capabilities, loads, UE capabilities, or interference conditions of the first TPs.

26. The central controller of claim 24, wherein the processor executes the instructions to update a central database in accordance with the subset of the first TPs.

27. A first transmission point (TP) comprising:
   a non-transitory memory storage comprising instructions; and
   a processor in communication with the memory storage, wherein the processor executes the instructions to:
   perform an uplink synchronization with a user equipment (UE),
   initiate acknowledgements from second TPs to the UE to trigger beam-formed random access channel responses (RARs) to the UE,
   receive an information regarding a number of RARs received by the UE; and
   send information regarding selected transmission parameters to the UE.

28. The first TP of claim 27, wherein the processor executes the instructions to receive a beam-formed random access channel (RACH) from the UE, and send a beam-formed RAR to the UE.

29. The first TP of claim 27, wherein the processor executes the instructions to to send information regarding the number of RARs received by the UE to a central controller, and send information regarding the number of RARs received by the UE to the second TPs.

* * * * *

UNITED STATES PATENT AND TRADEMARK OFFICE
CERTIFICATE OF CORRECTION

PATENT NO. : 10,057,787 B2
APPLICATION NO. : 15/092388
DATED : August 21, 2018
INVENTOR(S) : Richard Stirling-Gallacher It is certified that error appears in the above-identified patent and that said Letters Patent is hereby corrected as shown below:

In the Claims

In Column 32, Line 15, Claim 29, delete "the instructions to to send information" and insert --the instructions to send information--.

Signed and Sealed this
Thirtieth Day of October, 2018

Andrei Iancu
*Director of the United States Patent and Trademark Office*